United States Patent
Harada et al.

(10) Patent No.: US 9,159,973 B2
(45) Date of Patent: Oct. 13, 2015

(54) BATTERY MODULE AND POWER SUPPLY APPARATUS

(75) Inventors: Susumu Harada, Hitachinaka (JP); Atsuo Suga, Yokohama (JP); Sadayuki Aoki, Takahagi (JP)

(73) Assignee: Hitachi Automotive System, Ltd., Hitachinaka-shi (JP)

( * ) Notice: Subject to any disclaimer, the term of this patent is extended or adjusted under 35 U.S.C. 154(b) by 524 days.

(21) Appl. No.: 13/540,675

(22) Filed: Jul. 3, 2012

(65) Prior Publication Data

US 2013/0011713 A1  Jan. 10, 2013

(30) Foreign Application Priority Data

Jul. 4, 2011  (JP) .................................. 2011-148280

(51) Int. Cl.
| | |
|---|---|
| H01M 2/10 | (2006.01) |
| H01M 10/6557 | (2014.01) |
| H01M 10/651 | (2014.01) |
| H01M 10/613 | (2014.01) |
| H01M 10/647 | (2014.01) |

(52) U.S. Cl.
CPC .......... *H01M 2/1077* (2013.01); *H01M 10/613* (2015.04); *H01M 10/651* (2015.04); *H01M 10/6557* (2015.04); *H01M 10/647* (2015.04)

(58) Field of Classification Search
CPC .......... H01M 2/1077; H01M 10/5004; H01M 10/5036; H01M 10/5059; H01M 10/5032
See application file for complete search history.

(56) References Cited

U.S. PATENT DOCUMENTS

| | | | |
|---|---|---|---|
| 2006/0132101 | A1 | 6/2006 | Ambrosio et al. |
| 2009/0325054 | A1* | 12/2009 | Payne et al. .................. 429/120 |
| 2011/0097617 | A1 | 4/2011 | Gu et al. |
| 2011/0174004 | A1 | 7/2011 | Heckenberger et al. |

FOREIGN PATENT DOCUMENTS

| | | |
|---|---|---|
| EP | 2 187 473 A1 | 5/2010 |
| JP | 2003-130517 A | 5/2003 |
| JP | 2006-210245 A | 8/2006 |
| JP | 2008-59950 A | 3/2008 |
| JP | 2009-134901 A | 6/2009 |
| JP | 2010-62130 A | 3/2010 |
| JP | 2010-123349 A | 6/2010 |

(Continued)

OTHER PUBLICATIONS

European Search Report dated Sep. 19, 2012 (Six (6) pages).

(Continued)

*Primary Examiner* — Raymond Alejandro
(74) *Attorney, Agent, or Firm* — Crowell & Moring LLP

(57) ABSTRACT

Equalization of a temperature distribution in a flow direction on a cooling plate is facilitated so that temperatures of plural cells that thermally contact with the cooling plate are equalized, to reduce variability in the state of charge-discharge and the lifetimes of the respective cells. A battery module includes a cooling plate having a refrigerant channel in which a refrigerant circulates, and plural cells that are thermally conductively coupled onto a surface of the cooling plate, in which the refrigerant channel is formed with plural large diameter pipes that decelerate the refrigerant, and plural small diameter pipes that accelerate the refrigerant, a channel sectional area of the large diameter pipes is larger than a refrigerant channel sectional area of the small diameter pipes arranged on an inflow side of the large diameter pipes.

8 Claims, 25 Drawing Sheets

(56) References Cited

FOREIGN PATENT DOCUMENTS

| | | |
|---|---|---|
| JP | 2010-156533 A | 7/2010 |
| WO | WO 2010/028692 A1 | 3/2010 |
| WO | WO 2010/117092 A1 | 10/2010 |

OTHER PUBLICATIONS

English translation of Japanese Office Action dated Jun. 3, 2014 (nine pages).

English translation of Japanese Office Action dated Oct. 14, 2014 (nine pages).

* cited by examiner

FIRST EMBODIMENT

SECOND EMBODIMENT

THIRD EMBODIMENT

BATTERY MODULE AND POWER SUPPLY APPARATUS

BACKGROUND OF THE INVENTION

1. Technical Field

The present invention relates to a battery module having a plurality of chargeable and dischargeable battery cells connected to each other, and more particularly to a cooling structure for the battery module.

2. Background Art

The battery module mounted in hybrid vehicles and electric vehicles is configured by a combination of a large number of secondary batteries such as a lithium ion battery cell, a nickel hydride battery cell, or a nickel-cadmium battery cell. Charge and discharge currents of the battery module are generally large, and heat generation is also increased, as a result of which a temperature rise of the battery cell per se also increases. The temperature rise in the battery cell needs to be reduced as much as possible so as to be rapidly cooled from the view point of the lifetime of battery.

As a method of rapidly cooling the battery cell, there is a method using a refrigerant. There has been known a method in which a plurality of cells are coupled onto a surface of a cooling plate having a refrigerant channel through an insulating sheet so as to be cooled, and the refrigerant is supplied to the cooling plate to cool the battery cells (refer to JP-A-2010-62130).

SUMMARY OF THE INVENTION

However, in the refrigerant channel disclosed in JP-A-2010-62130, because a flow of refrigerant is even, a thermal boundary layer develops along the flow of refrigerant. Because the thermal boundary layer is a resistant element against heat transfer, heat transfer between the refrigerant and a heat transfer pipe is blocked more toward a downstream side. Accordingly, a surface temperature of the cooling plate disclosed in JP-A-2010-62130 becomes higher toward the downstream side along a flow direction of the refrigerant. As a result, the plurality of cells arranged on the surface of the cooling plate cannot be evenly cooled.

According to a first aspect of the present invention, there is provided a battery module including a cooling plate having a refrigerant channel in which the refrigerant circulates; and a plurality of cells that are thermally conductively coupled onto a surface of the cooling plate, in which the refrigerant channel is formed with a plurality of deceleration parts that decelerate the refrigerant, and a plurality of acceleration parts that accelerate the refrigerant, a channel sectional area of the deceleration parts is larger than a refrigerant channel sectional area of the deceleration part on an inflow side, and a channel sectional area of the acceleration parts is smaller than a refrigerant channel sectional area of the acceleration part on the inflow side.

According to a second aspect of the present invention, in the battery module according to the first aspect, the channel sectional area of the deceleration parts is larger than the channel sectional area of the acceleration parts, and the deceleration parts and the acceleration parts are alternately disposed along a flow direction of the refrigerant.

According to a third aspect of the present invention, in the battery module according to the first or second aspect, the refrigerant channel is formed of a heat transfer pipe incorporated into the cooling plate.

According to a fourth aspect of the present invention, in the battery module according to anyone of the first to third aspects, a sectional area reduction part that gradually decreases the channel sectional area toward the flow direction of the refrigerant from the deceleration parts is disposed between the deceleration parts and the acceleration parts, and a sectional area enlargement part that gradually increases the channel sectional area toward the flow direction of the refrigerant from the acceleration parts is disposed between the acceleration parts and the deceleration parts.

According to a fifth aspect of the present invention, in the battery module according to any one of the first to fourth aspects, a plurality of refrigerant channels are provided, and the plurality of refrigerant channels are disposed in parallel to each other.

According to a sixth aspect of the present invention, in the battery module according to any one of the first to fifth aspects, a cross-sectional shape of the refrigerant channel is circular.

According to a seventh aspect of the present invention, in the battery module according to any one of the first to fifth aspects, a cross-sectional shape of the refrigerant channel is polygonal.

According to an eighth aspect of the present invention, in the battery module according to any one of the first to seventh aspects, the acceleration parts are formed by mechanically crushing the heat transfer pipe from an external.

According to a ninth aspect of the present invention, in the battery module according to any one of the first to eighth aspects, the plurality of cells are arranged along the flow direction of the refrigerant.

According to a tenth aspect of the present invention, there is provided an power supply apparatus including a cooling system having a plurality of battery modules according to any one of first to ninth aspects for cooling refrigerant, in which the refrigerant cooled by the cooling system is branched and supplied to refrigerant channels of the cooling plates of the respective battery modules, and the refrigerant discharged from the refrigerant channels of the cooling plates of the respective battery modules is merged together, and recovered into the cooling system.

According to the present invention, the refrigerant within the heat transfer pipe is repetitively accelerated or decelerated so as to suppress the development of the thermal boundary layer. As a result, the equalization of a temperature distribution in the flow direction on the cooling plate is facilitated so that temperatures of the plurality of cells that thermally contact with the cooling plate can be equalized, thereby making it possible to reduce a variability in the state of charge-discharge and the lifetimes of the respective cells.

DETAILED DESCRIPTION OF THE EMBODIMENTS

First Embodiment

Hereinafter, a description will be given of a battery module and an power supply apparatus according to embodiments of the present invention with reference to the accompanying drawings.

Figure 1:
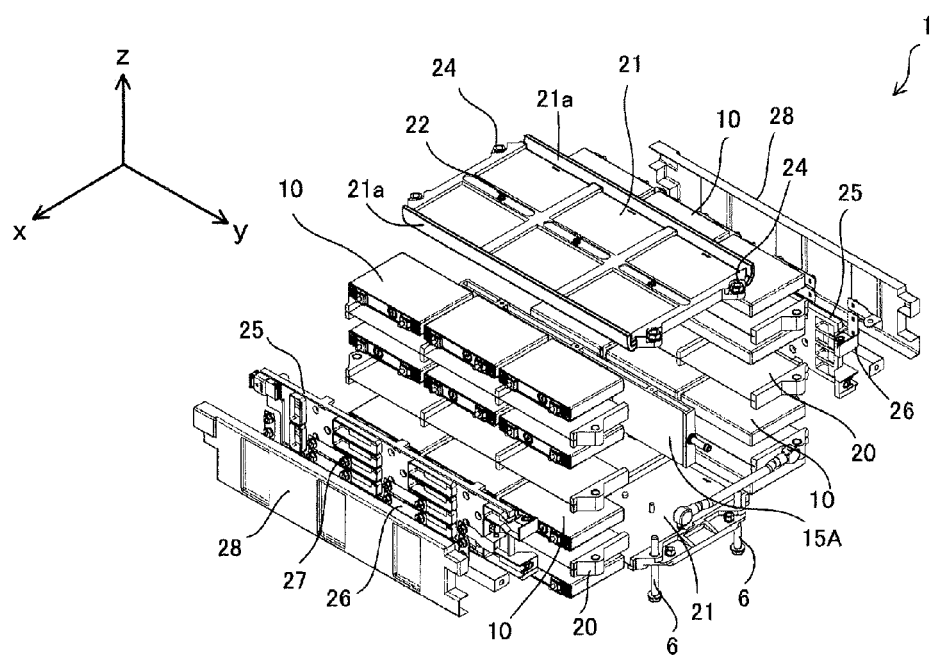
FIG. 1 is an exploded perspective view illustrating a battery module according to a first embodiment of the present invention.
Figure 2:
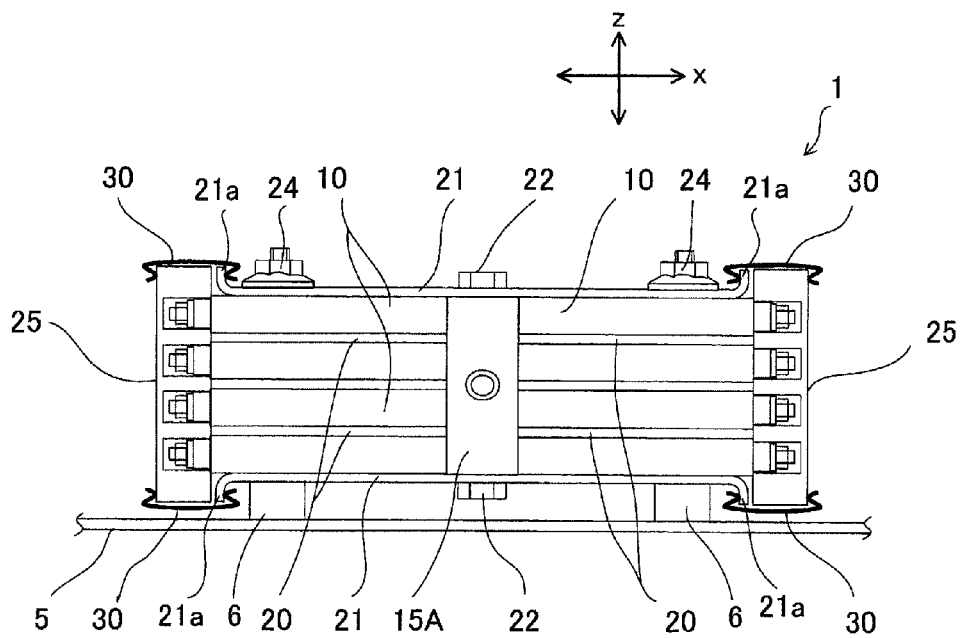
FIG. 2 is a front view illustrating the battery module illustrated in FIG. 1.

FIG. 1 is an exploded perspective view illustrating a battery module 1 according to a first embodiment of the present invention, and FIG. 2 is a front view illustrating the battery module 1 illustrated in FIG. 1, viewed from a front side. In FIG. 2, covers 28 that will be described later is omitted.

The battery module 1 includes a large number of cells 10. As illustrated in FIG. 1, it is assumed that a depth direction is an x-direction, a longitudinal direction is a y-direction, and a height direction is a z-direction. A cooling plate 15A is disposed in a substantially center of the battery module 1 in the x (depth) direction. The cooling plate 15A has a plate shape having a front surface with a size in the z (height) direction larger than that in the x (depth) direction, and lateral surfaces extended longwise in the y (length) direction. The cells 10 are arrayed three in the y (length) direction and four in the z (height) direction, along one surface (front surface) of the cooling plate 15A and the other surface (rear surface) facing the one surface in the thickness direction as shown in the figure.

Cell division plates 20 are interposed between the respective adjacent cells 10. One end plate 21 that covers the overall uppermost cell 10 arrayed on an x-y plane is disposed on a top of the uppermost cell 10. The other end plate 21 that covers the overall lowermost cell 10 arrayed on the x-y plane is disposed on a bottom of the lowermost cell 10. Both sides of the respective end plates 21 along the y (length) direction are each formed with a bend part 21a bent in the z (height) direction.

Terminal covers 25 that cover lateral surfaces (y-z plane) of all the cells 10 are arranged outside of the cells 10 arrayed in 3×4 in the x (depth) direction. The covers 28 are disposed outside of the respective terminal covers 25 in the x (depth) direction.

Figure 3:
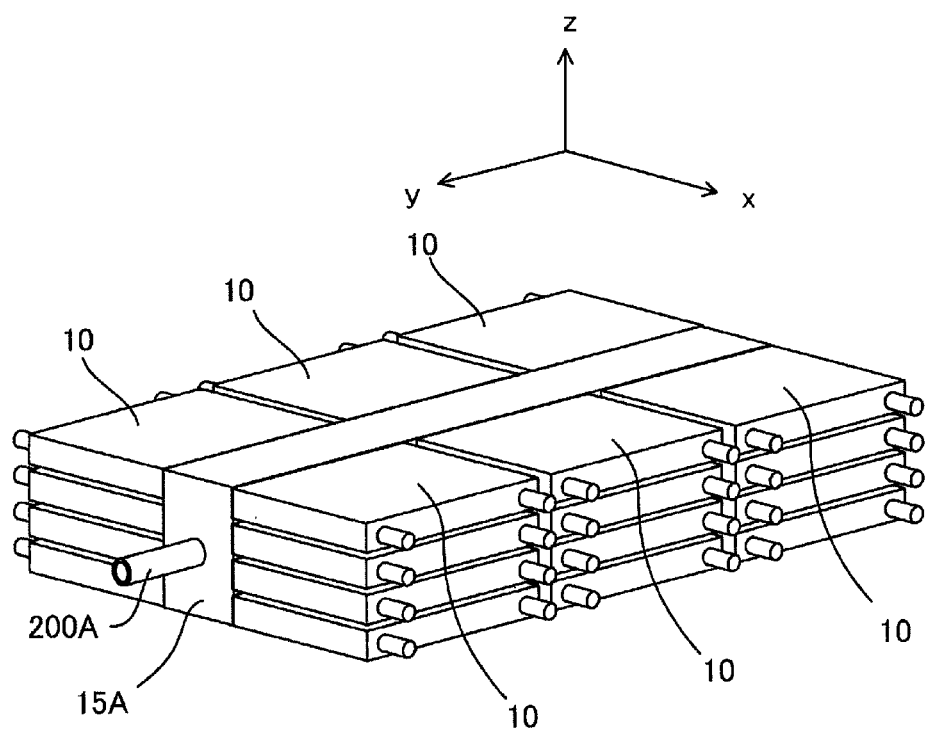
FIG. 3 is a perspective view illustrating a cooling structure of the battery module illustrated in FIG. 1.
Figure 4:
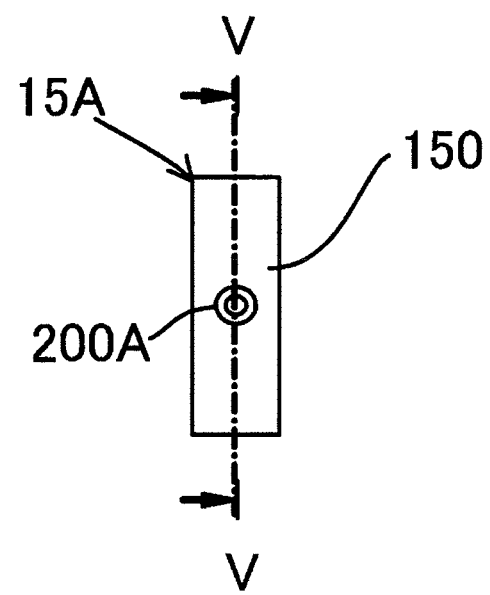
FIG. 4 is a front view illustrating a cooling plate configuring the battery module illustrated in FIG. 1.
Figure 5:
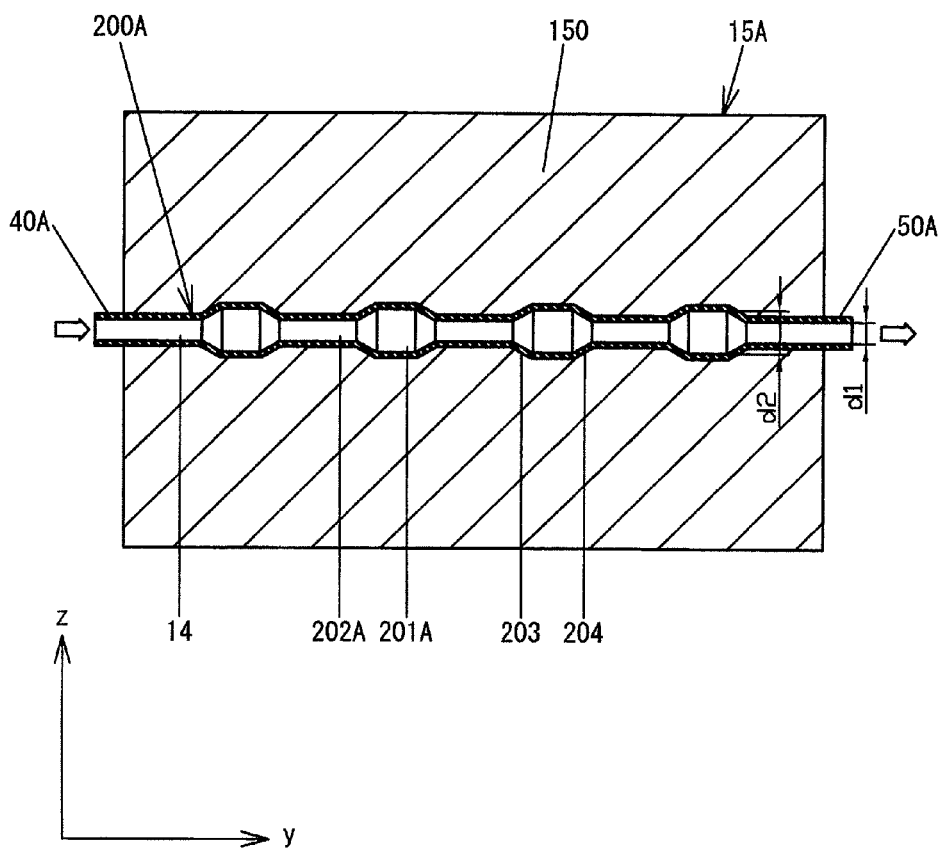
FIG. 5 is a cross-sectional view taken along a line V-V in FIG. 4.

FIG. 3 is a perspective view illustrating a cooling structure of the battery module, FIG. 4 is a front view illustrating the cooling plate 15A viewed from the front side, and FIG. 5 is a cross-sectional view taken along a line V-V in FIG. 4.

As illustrated in FIGS. 3 to 5, the cooling plate 15A includes a cooling block 150 and a heat transfer pipe 200A. The cooling block 150 is made of metal such as die-cast aluminum, aluminum, or magnesium, or an insulating resin having a thermal conductivity of 1 W/m·K or more. The heat transfer pipe 200A configures a refrigerant channel having a circular cross-section in which refrigerant such as ethylene glycol solution circulates. The heat transfer pipe 200A is made of metal such as aluminum, copper, ion, or stainless steel, or an insulating resin having a thermal conductivity of 1 W/m·K or more.

In order to fix the heat transfer pipe 200A in the cooling block 150 to form the cooling plate 15A, for example, the cooling block 150 is casted or molded with the heat transfer pipe 200A. The heat transfer pipe 200A according to this embodiment is configured to repetitively accelerate and decelerate the refrigerant that passes into the heat transfer pipe 200A. A specific configuration of the heat transfer pipe 200A will be described later.

Figure 6:
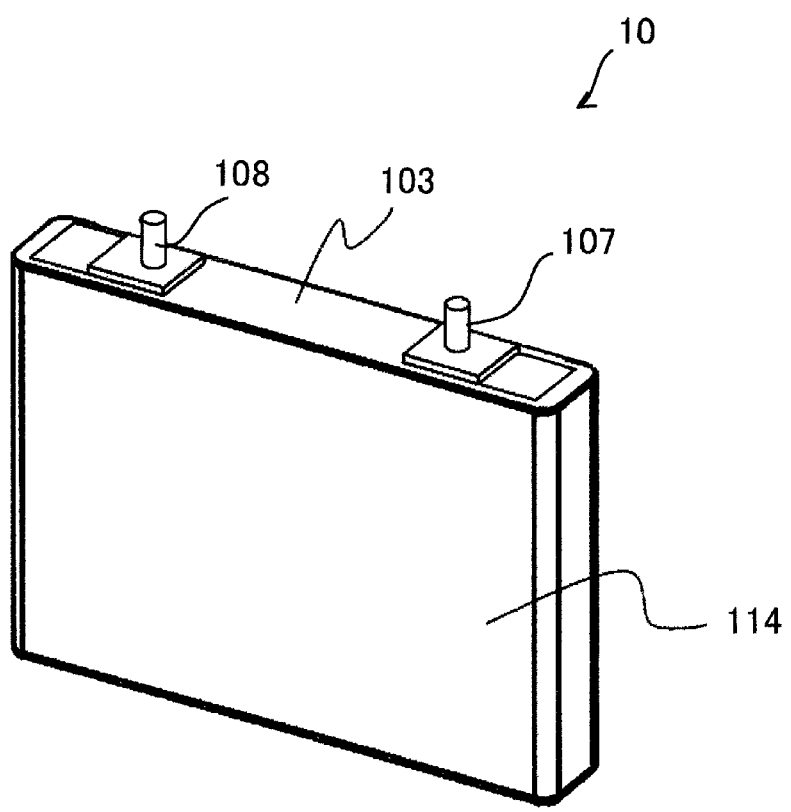
FIG. 6 is an external perspective view illustrating an example of each cell used in the battery module according to the present invention.
Figure 7:
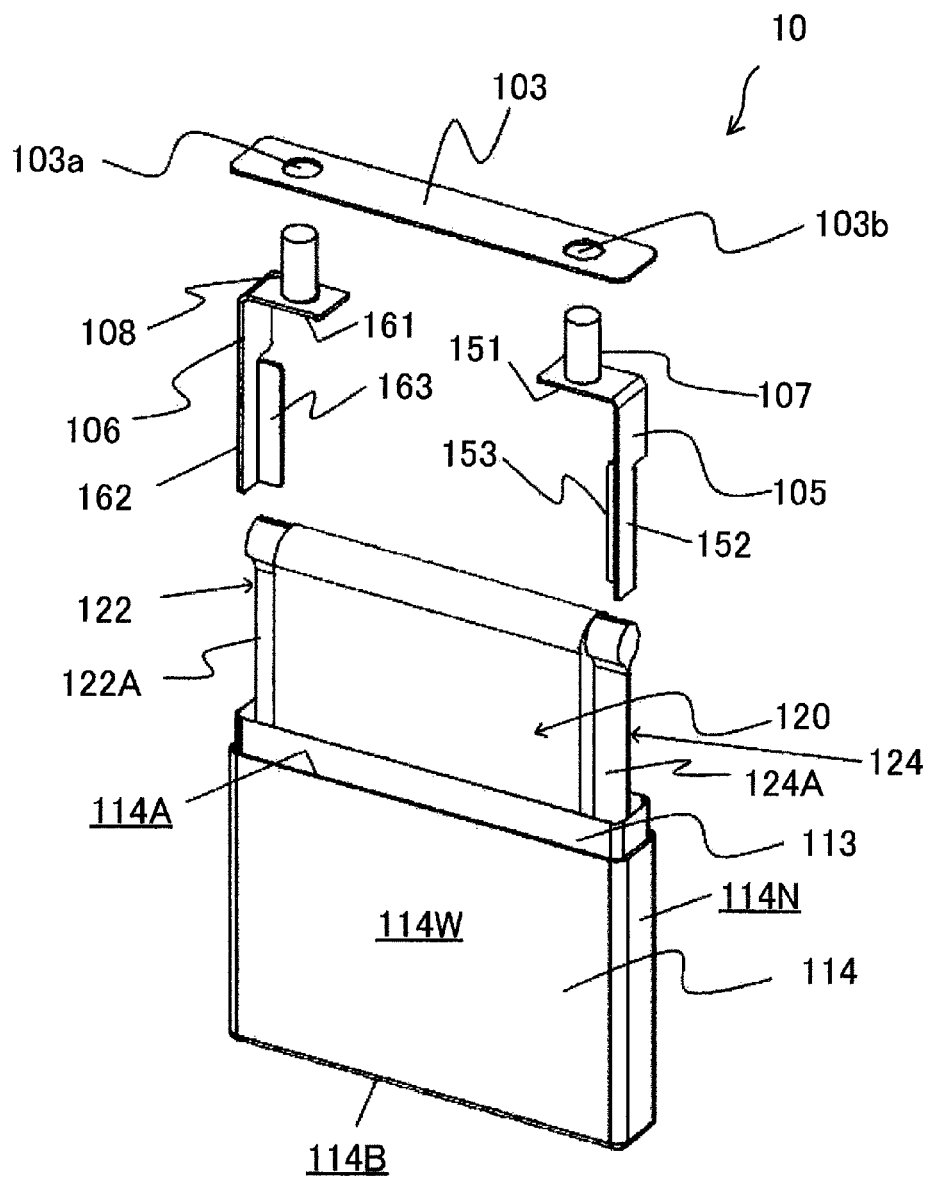
FIG. 7 is an exploded perspective view illustrating the cell illustrated in FIG. 6.

The cells 10 are each formed of, for example, a prismatic lithium-ion battery. FIG. 6 is an external perspective view of the cell 10, FIG. 7 is an exploded perspective view of the cell 10 illustrated in FIG. 6, and FIG. 8 is a perspective view of a spirally wound battery element group 120 configuring each of the cells 10.

The cells 10 each have a structure in which a flattened spirally wound battery element group 120 is housed through an insulating case 113 within a battery can 114 of a bottomed cuboid having one surface opened, and an opening part 114A of the battery can 114 is sealed with a battery cap 103. A case exterior is configured by the battery can 114 and the battery cap 103. A positive output part 108 and a negative output part 107 are protruded toward the battery cap 103 from the interior. The positive output part 108 and the negative output part 107 configure positive and negative external terminals provided on a surface of the case exterior. The positive output part 108 and the negative output part 107 function as terminals for outputting an electric power generated by the spirally wound battery element group 120 to the external, and for charging the spirally wound battery element group 120 with an electric power generated externally. The positive output part 108 and the negative output part 107 are integrated with a positive electrode collector 106 and a negative electrode collector 105 which will be described later, respectively.

The battery can 114 is made of metal, and formed with a depth dimension larger than a dimension of short sides of the opening part through a deep drawing technique. The battery can 114 is configured by a flat case having wide side surfaces 114W large in area, narrow side surfaces 114N small in area, and a bottom surface (can bottom) 114B that is a case bottom. The battery can 114 has an opening part 114A in a top surface. The battery cap 103 is fixed to the opening part 114A of the battery can 114 through a laser beam welding technique. The battery cap 103 is formed with opening parts 103a and 103b through which the positive output part 108 and the negative output part 107, which are both ends of the cell 10, are inserted. The battery cap 103 is formed with an inlet (not show), and after an electrolyte has been poured into the battery can 114 from the inlet, the inlet is sealed by laser beam welding.

Figure 8:
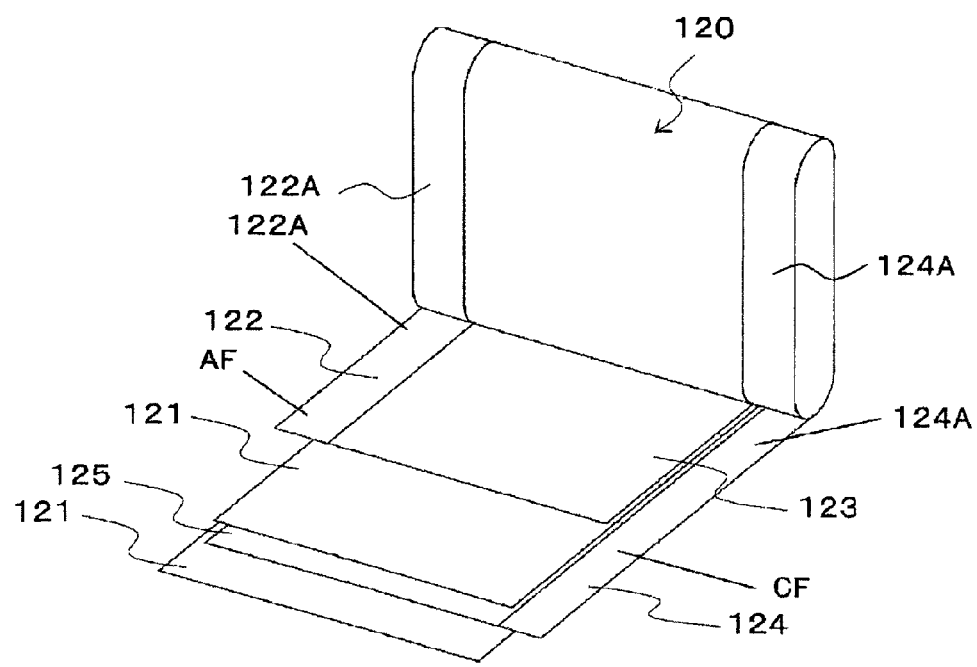
FIG. 8 is a perspective view illustrating a spirally wound battery element group used for the cell illustrated in FIG. 7.

As illustrated in FIG. 8, the spirally wound battery element group 120 is formed in such a manner that a positive plate 122 having a positive foil AF coated with a positive electrode active material mixture 123, and a negative plate 124 having a negative foil CF coated with a negative electrode active material mixture 125 are wound through a separator 121 into an oval cross-sectional shape. The positive plate 122 is formed with an uncoated part 122A where the positive foil AF is exposed without being coated with the positive electrode active material mixture 123 as a positive electrode connection part. The negative plate 124 is formed with an uncoated part 124A where the negative foil CF is exposed without being coated with the negative electrode active material mixture 125 as a negative electrode connection part. The uncoated parts 122A and 124A are arranged on both ends of the spirally wound battery element group 120 in the width direction, and extend along both of the narrow side surfaces 114N of the battery can 114.

When the cell 10 is a lithium-ion battery, the positive foil AF and the negative foil CF are made of aluminum and copper, respectively, and, for example, the positive electrode active material mixture is made of $LiCoO_2$, and the negative electrode active material mixture is made of graphite. The positive electrode collector 106 and the negative electrode collector 105 are made of the same material as that of the positive foil AF and the negative foil CF, respectively.

The uncoated part 122A of the positive plate 122 is connected with the positive electrode collector 106. The uncoated part 124A of the negative plate 124 is connected with the negative electrode collector 105. The positive output part 108 is integral with the positive electrode collector 106, and the negative output part 107 is integral with the negative electrode collector 105.

Each of the positive electrode collector 106 and the negative electrode collector 105 is substantially L-shaped, and fixed to the battery cap 103.

The positive electrode collector 106 and the negative electrode collector 105 are formed integrally by pressing an aluminum plate and a copper plate, respectively. The positive electrode collector 106 and the negative electrode collector 105 include plate-like mounting parts 161 and 151 that extend along inner surfaces of the battery cap 103 up to the vicinity of inner surfaces of the narrow side surfaces 114N of the battery can 114, respectively. The positive output part 108 and the negative output part 107 are formed of respective columnar members, and fixedly swaged onto the mounting parts 161 and 151, respectively. The positive output part 108 and the negative output part 107 are externally threaded, and connected with a busbar 26 to be described later by nuts.

The positive electrode collector 106 and the negative electrode collector 105 include connection parts 162 and 152 that extend toward the bottom along the narrow side surfaces 114N of the battery can 114 substantially at a right angle to ends of the mounting parts 161 and 151. The connection parts 162 and 152 extend along the uncoated part 122A and the uncoated part 124A of the positive plate 122 and the negative plate 124, respectively. The connection parts 162 and 152 are equipped with positive and negative electrode battery element connection parts 163 and 153 that face the uncoated parts 122A and 124A of the positive plate 122 and the negative plate 124, respectively. The positive and negative electrode battery element connection parts 163 and 153 are bent along the wide side surfaces 114W at a right angle to the connection parts 162 and 152 disposed in parallel to the narrow side surfaces 114N, respectively. The positive and negative electrode battery element connection parts 163 and 153 are joined to the uncoated parts 122A and 124A by ultrasonic welding, respectively.

Figure 9:
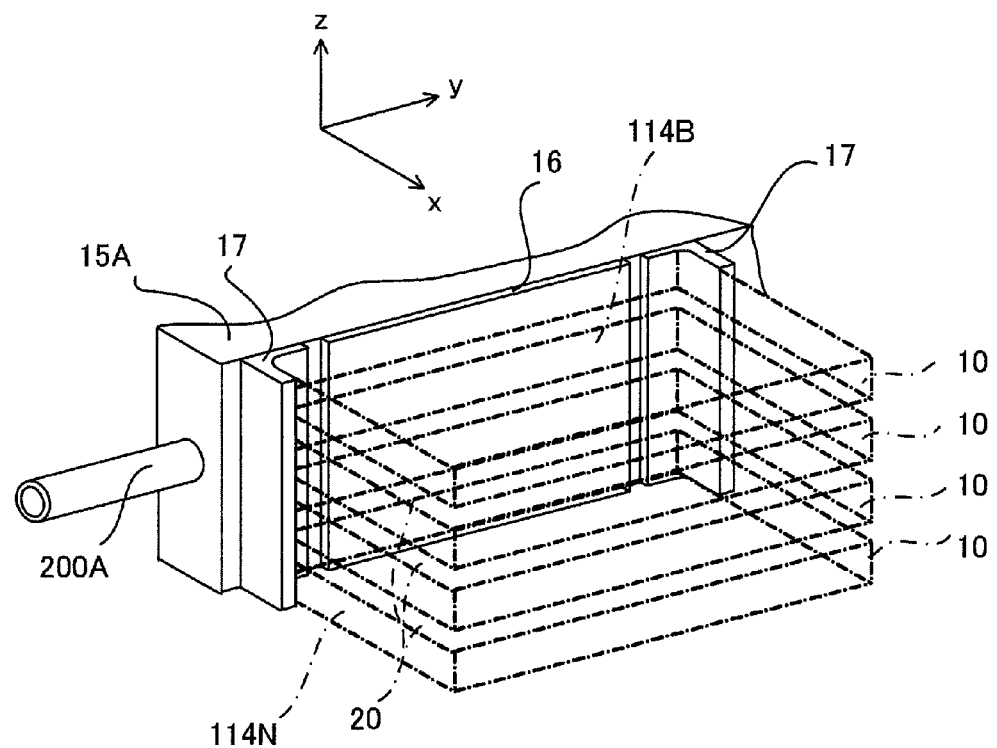
FIG. 9 is a perspective view illustrating a coupling structure that enables thermal conduction between the cooling plate and the cells in the battery module illustrated in FIG. 1.
Figure 10:
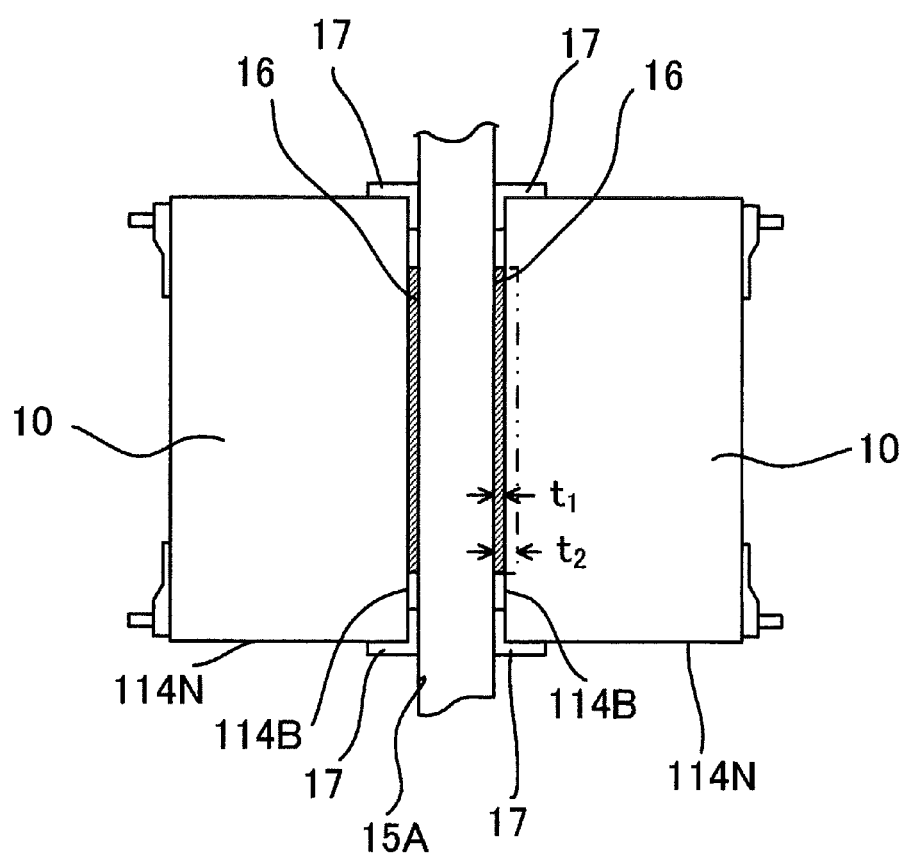
FIG. 10 is a plan view illustrating the battery module illustrated in FIG. 9.

FIG. 9 is a perspective view illustrating a coupling structure that enables thermal conduction between the cooling plate 15A and the cells 10, and FIG. 10 is a plan view illustrating the structure illustrated in FIG. 9 viewed from above. Cell mounting plates 17 each having an L-shaped side surface are fitted to portions of the front and rear surfaces of the cooling plate 15A to which the cells 10 are mounted, respectively. The cell mounting plates 17 are fitted to corners where the bottom surface (can bottom) 114B and the narrow side surfaces 114N of each cell 10 are adjacent to each other, and are line-symmetric with respect to an interval of the length of one cell 10 in the y-direction. A height of each cell mounting plate 17 in the z-direction is so designed t hold the four cells 10 through the cell division plates 20 interposed between the respective adjacent cells 10. Three pairs of the cell mounting plates 17 are arranged on each of the front surface and the rear surface of the cooling plate 15A so as to hold the cells 10 arrayed in 3×4. The cell mounting plates 17 are made of resin material, and a gap t1 is defined between each of the front surface and the rear surface of the cooling plate 15A, and the bottom surface 114B of each cell 10 (refer to FIG. 10).

A thermal conductive member 16 is interposed in a gap as large as the thickness of the respective cell mounting plates 17, that is, between the bottom surface 114B of the cells 10 and the front surface (or rear surface) of the cooling plate 15A. The thermal conductive member 16 has a thickness t2 as indicated by two-dot chain lines in FIG. 10 before the cells 10 are mounted on the cooling plate 15A. Accordingly, in a state where the cells 10 are mounted on the cooling plate 15A, the thermal conductive member 16 is compressed at a compression ratio $(t2-t1) \times 100/t2(\%)$. As a result, the bottom surfaces 114B of the respective cells 10 and the front surface (or rear surface) of the cooling plate 15A are surely thermally conductively coupled with each other, and the cells 10 are cooled by the cooling plate 15A by thermal conduction. There is a need to manage the compression rate so that the thermal conductive member 16 does not cause permanent deformation. However, according to this embodiment, the thickness t1 of the compressed thermal conductive member 16 is determined according to the thickness of the cell mounting plates 17, and therefore the management of the thickness t1 is very easy.

The thermal conductive member 16 can be formed of an insulating thermal conductive sheet having the thermal conductivity of 1 W/m·K or more. When each bottom surface 114B of the cells 10 is covered with an insulating resin, the thermal conductive member 16 can be made of metal.

The battery can 114 of the cells 10 is not connected with the positive electrode collector 106 or the negative electrode collector 105. However, the potential of the positive electrode side or the negative electrode side is applied to the battery can 114 through the electrolyte poured into the battery can 114, and the battery can 114 of each cell 10 has a potential different from that of the positive electrode or the negative electrode. Accordingly, the battery cans 114 are short-circuited if those battery cans 114 are electrically connected with each other.

In this embodiment, the thermal conductive member 16 and the cell mounting plates 17 are interposed between the cooling plate 15A and the cells 10, and the cooling plate 15A and the cells 10 do not contact directly with each other. Therefore, even when a dew condensation occurs on the cooling plate 15A, the reliability can be ensured without the cells 10 being short-circuited.

When the wide side surfaces 114W of the cells 10 are coated with an insulating material, the cell division plates 20 and the end plate 21 can be made of a material high in thermal conductivity such as aluminum, die-cast aluminum, copper, or iron. When the wide side surfaces 114W of the cells 10 are not coated with the insulating material, the cell division plates 20 and the end plate 21 can be made of polypropylene, polyamide, polyetherimide, PPS, PPA, PBT, or a high thermal conductive resin.

Figure 11:
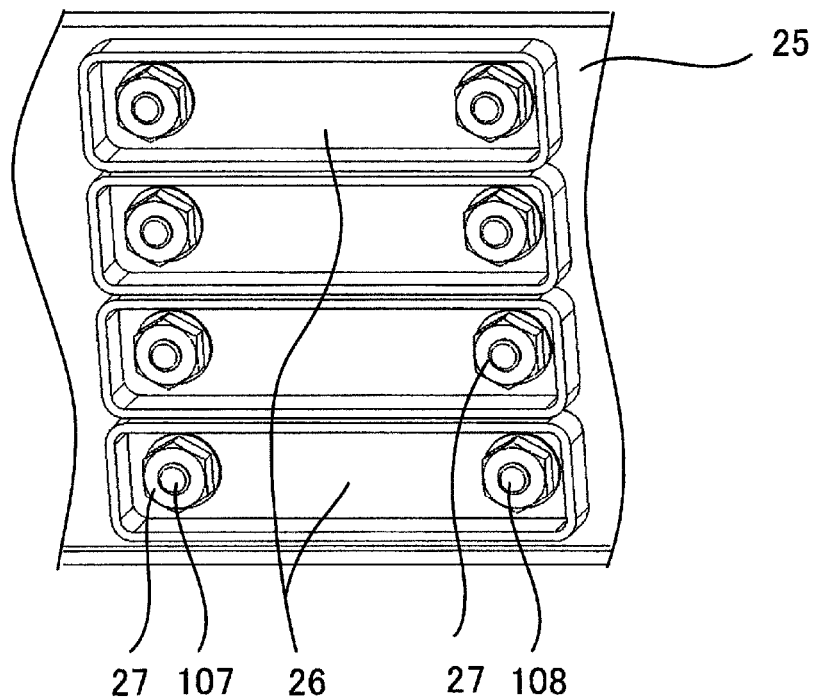
FIG. 11 is an enlarged perspective view illustrating a mounting structure of a busbar in the battery module illustrated in FIG. 1.

Referring to FIG. 1, the busbars 26 are mounted on an outer surface of the respective terminal covers 25. FIG. 11 is an enlarged perspective view illustrating a mounting structure of the busbars 26. The busbars 26 are fixed to the terminal cover 25 with nuts 27 in a state where the busbars 26 contact with the positive output parts 108 and the negative output parts 107 of the respective cells 10. The nuts 27 can be configured by, for example, skirt nuts or nuts with disc springs. Alternatively, the combination of the nuts and disc washers may be used.

Figure 12:
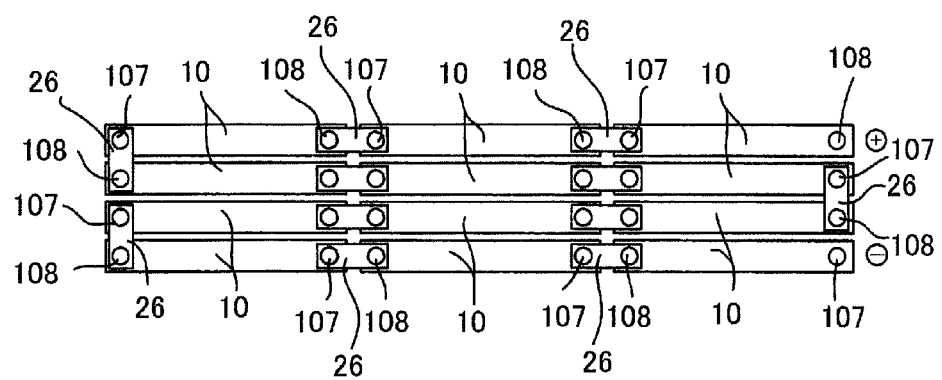
FIG. 12 is a side view illustrating a state in which a cover of the battery module illustrated in FIG. 1 is removed.

FIG. 12 is a side view illustrating a state in which the covers 28 of the battery module 1 is removed, in a state where all of the 3×4 cells 10 are connected in series by the busbars 26.

Referring to FIG. 12, the negative output part 107 of the top and left cell 10 and the positive output part 108 of the second top and left cell 10 are connected to each other by the busbar 26. The negative output part 107 of the second top and right cell 10 and the positive output part 108 of the third top and right cell 10 are connected to each other by the busbar 26. The negative output part 107 of the third top and left cell 10 and the positive output part 108 of the bottom and left cell 10 are connected to each other by the busbar 26. The negative output parts 107 and the positive output parts 108 of each of the other intermediate cells 10 are connected to each other by the busbars 26. With the above configuration, all of the 3×4 cells 10 are connected in series. Accordingly, a potential difference of the 12 cells 10 connected in series occurs between the positive output part 108 of the top and right cell 10 and the bottom and right negative output part 107.

As illustrated in FIG. 1, the covers 28 are arranged outside of the respective terminal covers 25 in a state where all of the cells 10 arranged on the front surface side and the rear surface side of the cooling plate 15A are connected in series by the busbars 26. The covers 28 are designed to prevent entering of conductive foreign material, for example, water, dust, oil, or composite material, and mounted so as to cover the overall outer side surfaces of the terminal covers 25. However, the covers 28 are not always required.

As illustrated in FIG. 2, the terminal covers 25 are coupled to the end plates 21 by clips 30 made of an elastic member in a state where the cells 10 are connected in series by the busbar 26.

Figure 13:
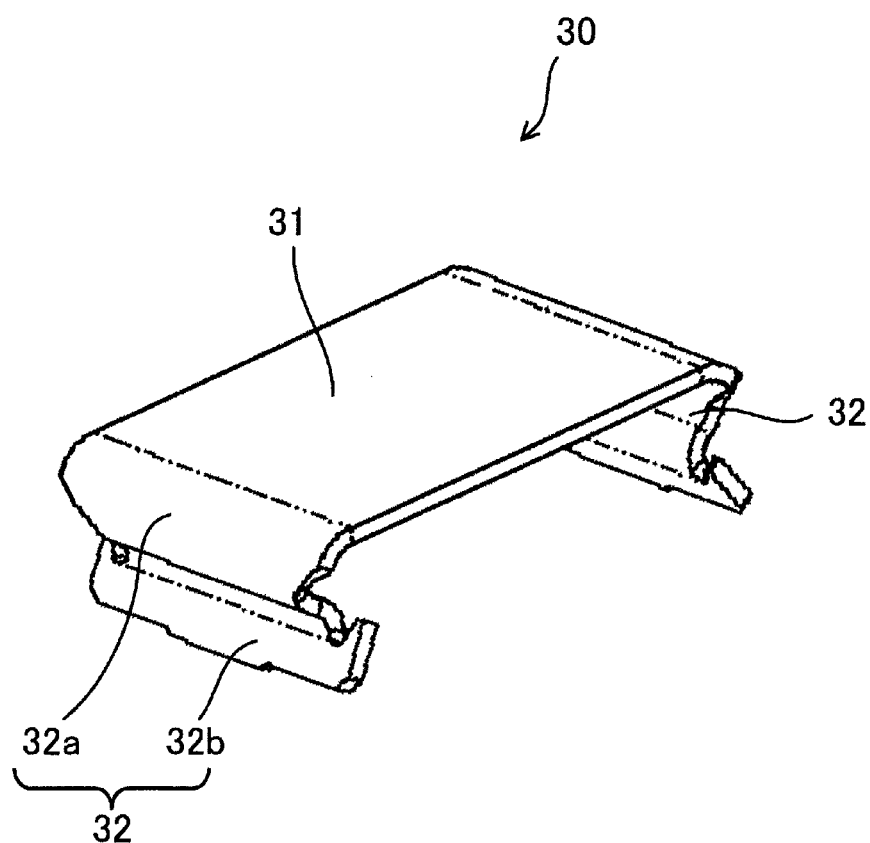
FIG. 13 is an external perspective view illustrating a clip for pushing the cells toward the cooling plate in the battery module illustrated in FIG. 1.

FIG. 13 is an external perspective view of the clips 30. Each of the clips 30 is formed by pressing a metal plate. Both sides of a base 31 of the clip 30 are formed with flexible parts 32 openable outward. Each of the flexible parts 32 includes a support 32a having a V-shaped side surface on the base 31 side, and a fitting part 32b inclined from the support 32a and opened outward.

In assembling the battery module 1, the three pairs of cell mounting plates 17 are mounted on each of the front surface side and the rear surface side of the cooling plate 15A. The thermal conductive member 16 is fitted between the paired cell mounting plates 17, and the cell 10 is further mounted thereon. The cell division plates 20 are interposed between the respective adjacent cells 10. The end plates 21 are arranged on the upper surface of the top cell 10 and the lower surface of the bottom cell 10, and bolts 6 are inserted through openings of the respective end plates 21 and openings formed in the front part and the rear part of the respective cell division plates 20, and then fixed with the nuts 24 (refer to FIG. 1). Although being not shown, bolt mounting holes parallel to the z (height) direction are formed in the upper surface and the lower surface of the cooling plate 15A, and bolt insertion openings are formed in the end plates 21. After the end plates 21 has been mounted by the bolts 6 and the nuts 24, bolts 22 are inserted through the bolt insertion openings of the end plates 21, and the bolts 22 are fixed to the bolt mounting holes of the cooling plate 15A (refer to FIG. 2). Fixing by the bolts 22 and the nuts 24 is provisional.

The terminal covers 25 are mounted to cover the side surfaces of the cells 10 and the cell division plates 20, and the respective cells 10 are connected to each other by the busbars 26. The terminal covers 25 are coupled to the end plates 21 by the clips 30. The bend part 21a of each end plate 21 and the outer side surface of each terminal cover 25 are positioned between the fitting parts 32b of the clip 30 on both sides thereof. When an external force is applied in a direction of pushing the clip 30, the clip 30 is pushed while being opened outward by inclination of the fitting part 32b.

When the clip 30 is pushed, the terminal cover 25 travels toward the end plate 21 side by an elastic force of the clip 30. As a result, the bottom surface 114B of each cell 10 compresses the thermal conductive member 16. In this way, a coupling structure is formed in a state where the bottom surface 114B of each cell 10 and the cooling plate 15A surely enable thermal conduction.

In this state, the bolts 22 and the nuts 24 are finally tightened with each other, to thereby complete the battery module 1 illustrated in FIG. 2.

Figure 14:
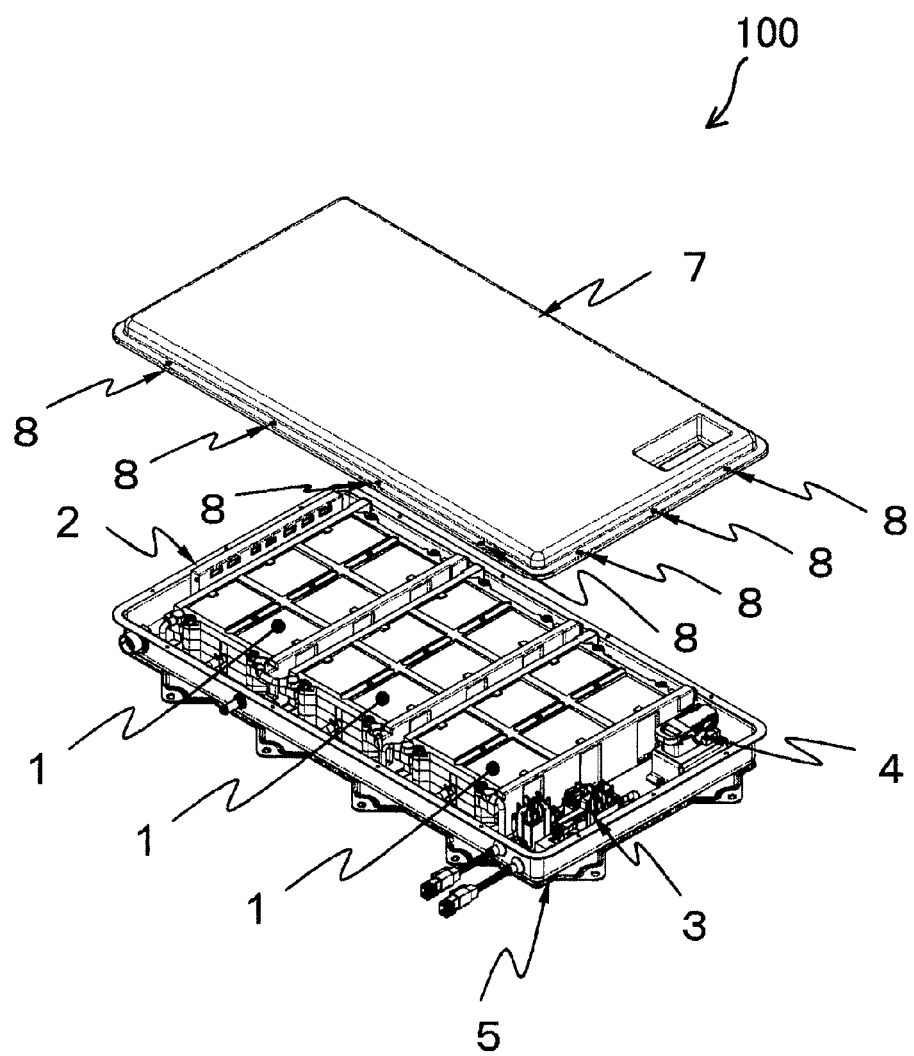
FIG. 14 is a perspective view illustrating an power supply apparatus according to a first embodiment of the present invention.
Figure 15:
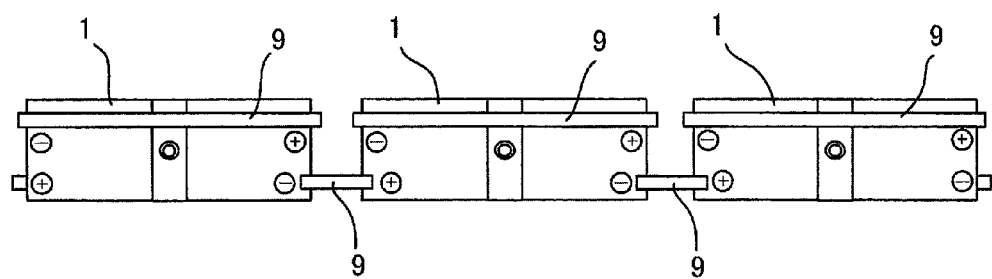
FIG. 15 is a diagram illustrating an electric connection state of the power supply apparatus illustrated in FIG. 14.
Figure 16:
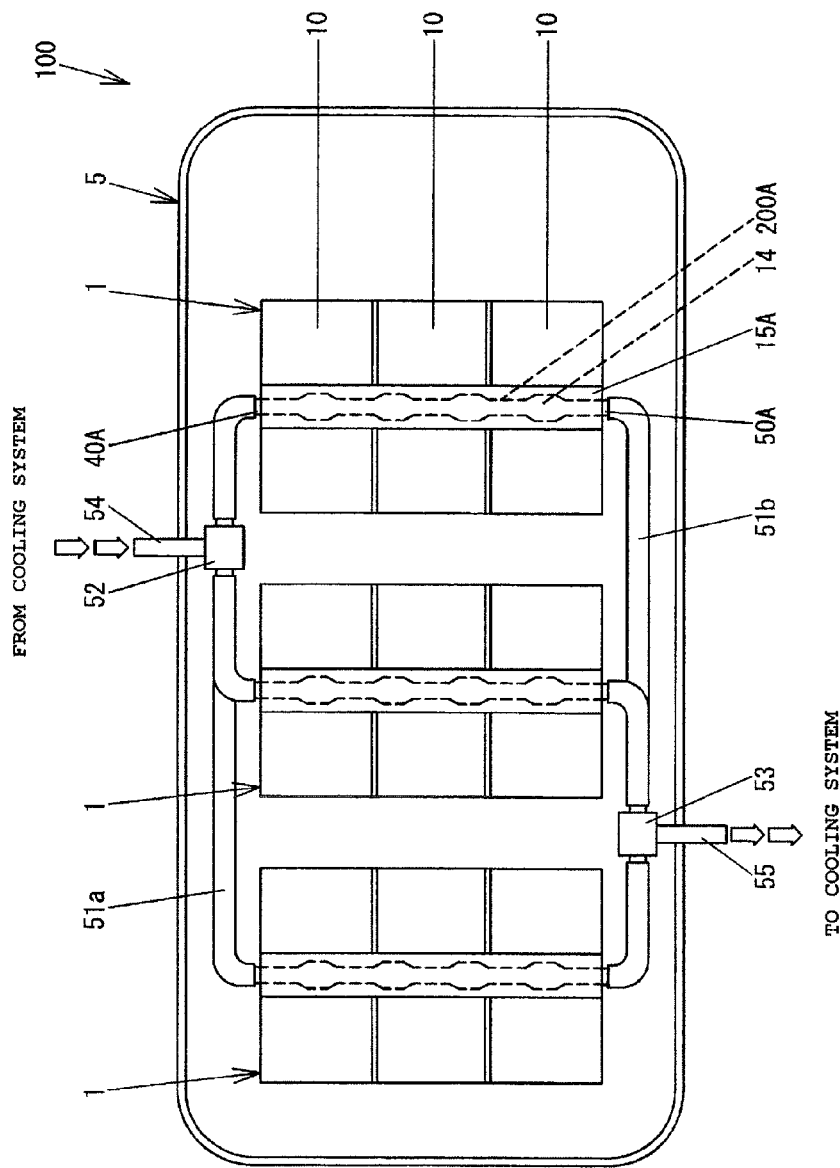
FIG. 16 is a plan view illustrating a layout of an interior in the power supply apparatus illustrated in FIG. 14.

FIG. 14 is a perspective view illustrating an power supply apparatus 100, and FIG. 15 is a diagram illustrating an electric connection state of the respective battery modules 1 within the power supply apparatus 100. FIG. 16 is a plan view illustrating a layout of an interior in the power supply apparatus 100.

As illustrated in FIG. 14, the power supply apparatus 100 is housed in a battery case 5 in a state where a plurality (three in FIG. 14) of battery modules 1 are connected to a battery control unit 2, a battery auxiliary device 3, and a disassembly-time current cutoff unit 4. A battery cover 7 is fixed to the battery case 5 with screws 8 from above of the battery case 5. The battery cover 7 is designed to prevent entering of conductive foreign material, for example, water, dust, oil, or chemicals from the external. The respective battery modules 1 are connected in series by high voltage lines 9 as illustrated in FIG. 15.

As illustrated in FIG. 16, a refrigerant inlet pipe 54 is arranged on one side plate of the battery case 5, and a refrigerant outlet pipe 55 is disposed on the other side plate of the battery case 5. The refrigerant inlet pipe 54 is connected to a branch pipe block 52 disposed within the battery case 5, and the refrigerant outlet pipe 55 is connected to a mergence pipe block 53 disposed within the battery case 5.

The heat transfer pipe 200A incorporated into the cooling plate 15A of each battery module 1 includes a refrigerant inlet 40A and a refrigerant outlet 50A which are protruded outward from the cooling plate 15A. Coupling pipes 51a and 51b made of rubber are connected to the refrigerant inlet 40A and the refrigerant outlet 50A, respectively.

The coupling pipes 51a connected to the refrigerant inlets 40A of the three battery modules 1 are connected to the branch pipe block 52, and the coupling pipes 51b connected to the refrigerant outlets 50A of the three battery modules 1 are connected to the mergence pipe block 53.

Although being not shown, the refrigerant supplied from the cooling system having a cooling fan, a radiator, and a compressor is branched by the branch pipe block 52 on the inlet side, evenly distributed to the respective coupling pipes 51a, and supplied to refrigerant channels 14 from the refrigerant inlets 40A of the cooling plates 15A in the respective battery modules 1. The refrigerant that has cooled the plurality of cells 10 configuring each battery module 1, and being discharged from the refrigerant outlets 50A is merged by the mergence pipe block 53 on the outlet side, recovered into the cooling system, and cooled by the cooling system.

A description will be given in detail of a configuration of the heat transfer pipe 200A incorporated into each cooling plate 15A according to this embodiment. As illustrated in FIG. 5, the heat transfer pipe 200A incorporated into the cooling plate 15A is a circular pipe, and includes a plurality of large diameter pipes 201A having an inner diameter d2 and a plurality of small diameter pipes 202A having an inner diameter d1 (inner diameter: d2>d1). The large diameter pipes 201A and the small diameter pipes 202A are alternately disposed in the flow direction of the refrigerant.

A widening pipe 203 whose inner diameter is gradually increased from each small diameter pipe 202A toward the flow direction of the refrigerant, that is, whose channel sectional area is gradually increased is disposed between the small diameter pipe 202A and the large diameter pipe 201A. A thinning pipe 204 whose inner diameter is gradually decreased from each large diameter pipe 201A toward the flow direction of the refrigerant, that is, whose channel sectional area is gradually decreased is disposed between the large diameter pipe 201A and the small diameter pipe 202A.

The heat transfer pipe 200A is formed by fabricating the large diameter pipes 201A, the small diameter pipes 202A, the widening pipe 203, and the thinning pipe 204, separately, and welding the respective pipes. The small diameter pipes 202A may be swaging-fabricated, and the large diameter pipes 201A may be formed by swelling the pipe through bulge processing.

A flow of the refrigerant within the heat transfer pipe 200A will be described with reference to FIG. 5.

The refrigerant supplied to the refrigerant inlet 40A flows in the small diameter pipe 202A, and then flows into the large diameter pipe 201A through the widening pipe 203. The channel sectional area of the large diameter pipes 201A is larger than the channel sectional area of the small diameter pipes 202A arranged on the inlet side of the large diameter pipes 201A. Accordingly, the refrigerant flowing into the large diameter pipes 201A is lower in flow rate than the refrigerant flowing into the small diameter pipes 202A. That is, the flow rate of the refrigerant flowing from the small diameter pipes 202A toward the large diameter pipes 201A is decelerated in the large diameter pipes 201A.

The refrigerant flowing in each large diameter pipe 201A flows into the small diameter pipe 202A through the thinning pipe 204. The channel sectional area of the small diameter pipes 202A is smaller than the channel sectional area of the large diameter pipes 201A arranged on the inlet side of the small diameter pipes 202A. Therefore, the refrigerant flowing in the small diameter pipes 202A is higher in flow rate than the refrigerant flowing in the large diameter pipes 201A. That is, the flow rate of the refrigerant flowing toward the small diameter pipes 202A from the large diameter pipes 201A is accelerated in the small diameter pipes 202A.

Accordingly, the refrigerant flowing in the heat transfer pipe 200A, where the plurality of small diameter pipes 202A and the plurality of large diameter pipes 201A are alternately disposed, flows while being alternately repetitively decelerated and accelerated. Then, the refrigerant cools the overall cooling plate 15A, and is discharged from the refrigerant outlet 50A.

Figure 17:
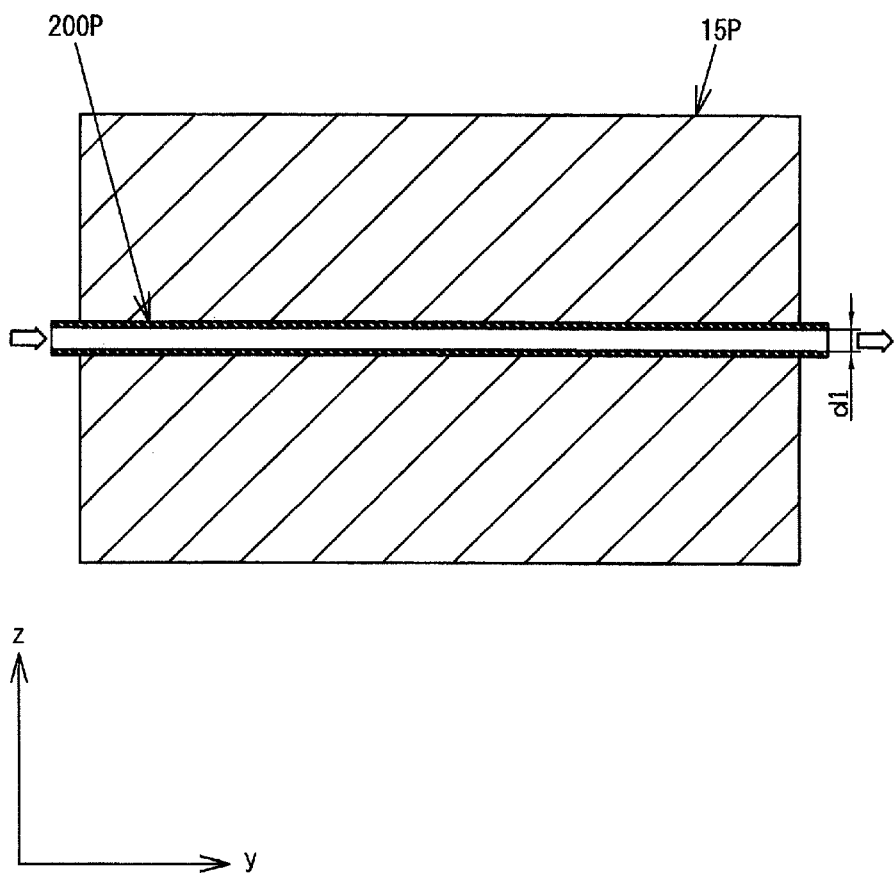
FIG. 17 is a cross-sectional view illustrating a cooling plate in a related art.

Thus, because the refrigerant flowing within the heat transfer pipe 200A is alternately repetitively decelerated and accelerated, the development of the thermal boundary layer is suppressed. On the contrary, as illustrated in FIG. 17, because a related-art heat transfer pipe 200P has the same inner diameter d1 from the refrigerant inlet to the refrigerant outlet, the thermal boundary layer is developed along the flow. Because the thermal boundary layer is a resistant element against heat transfer, heat transfer between the refrigerant and the heat transfer pipe 200P is blocked more toward a downstream side. Accordingly, a surface temperature of a related-art cooling plate 15P is higher toward the downstream side along the flow direction of the refrigerant, and the plurality of cells (not shown) arranged in parallel to the cooling plate 15P cannot be evenly cooled.

In this embodiment, as illustrated in FIG. 5, the refrigerant that has passed through each large diameter pipe 201A flows into the small diameter pipe 202A, and is accelerated, and therefore the heat transfer within the small diameter pipe 202A is improved. Conversely, since the flow rate is decelerated in the large diameter pipe 201A, there is a risk that the heat transfer within the large diameter pipe 201A is deteriorated. However, if the outer diameter of the large diameter pipes 201A is set to an appropriate size, that is, the heat transfer area is increased, that problem can be compensated. When the heat transfer area of the large diameter pipes 201A is increased, the amount of heat propagated to the refrigerant through the small diameter pipes 202A can be made substantially equal to the amount of heat propagated to the refrigerant through the large diameter pipes 201A. Therefore, the cooling plate 15A can be evenly cooled along the flow direction.

As described above, this embodiment can obtain the following operational advantages.

(1) The large diameter pipes 201A that decelerate the refrigerant flowing in the refrigerant channel 14 formed by the heat transfer pipe 200A and the small diameter pipes 202A that accelerate the refrigerant decelerated by the large diameter pipes 201A are alternately disposed. With this configuration, the development of the thermal boundary layer along the flow of the refrigerant is suppressed, thereby making it possible to improve the heat transfer between the refrigerant and the cooling plate 15A.

(2) Because the equalization of the temperature distribution on the cooling plate 15A in the flow direction is facilitated with the above advantage (1), the plurality of cells 10 that thermally contact with the cooling plate 15A can be evenly cooled to make the temperatures of the respective cells 10 even. This makes it possible to provide the battery module 1 high in the reliability with a reduction in the variability of the state of charge-discharge and the lifetimes of the respective cells 10.

(3) Because the cooling performance is improved with the above advantage (1), the cells 10 can be densely disposed, and the battery module 1 can be downsized.

(4) Because the widening pipe 203 and the thinning pipe 204 are provided between the large diameter pipes 201A and the small diameter pipes 202A, the flow is prevented from being detached from an inner wall of the heat transfer pipe so that the cooling plate 15A can be efficiently cooled. Further, a pressure loss can be reduced.

(5) In this embodiment, the three cells 10 are arranged on each of the front surface side and the rear surface side of the cooling plate 15A along the y (length) direction which is the flow direction of the refrigerant, and the four cells 10 are stacked on through the cell division plates 20 in the z (height) direction. When the plurality of cells 10 are arrayed along the flow direction of the refrigerant, the temperatures of the respective cells 10 arrayed in the flow direction of the refrigerant can be equalized, and the overall battery module can be downsized.

(6) Since the cells 10 are thermally coupled to the cooling plate 15A through the thermal conductive members 16 having the electrical insulation, the respective cells 10 can be prevented from being short-circuited.

(7) The refrigerant cooled by the cooling system is evenly distributed to the three battery modules 1 by the branch pipe block 52, and the refrigerant from the respective battery modules 1 is merged by the mergence pipe block 53, and recovered into the cooling system. This makes it possible to provide the power supply apparatus 100 that can efficiently cool the plurality of battery modules 1.

Second Embodiment

Figure 18:
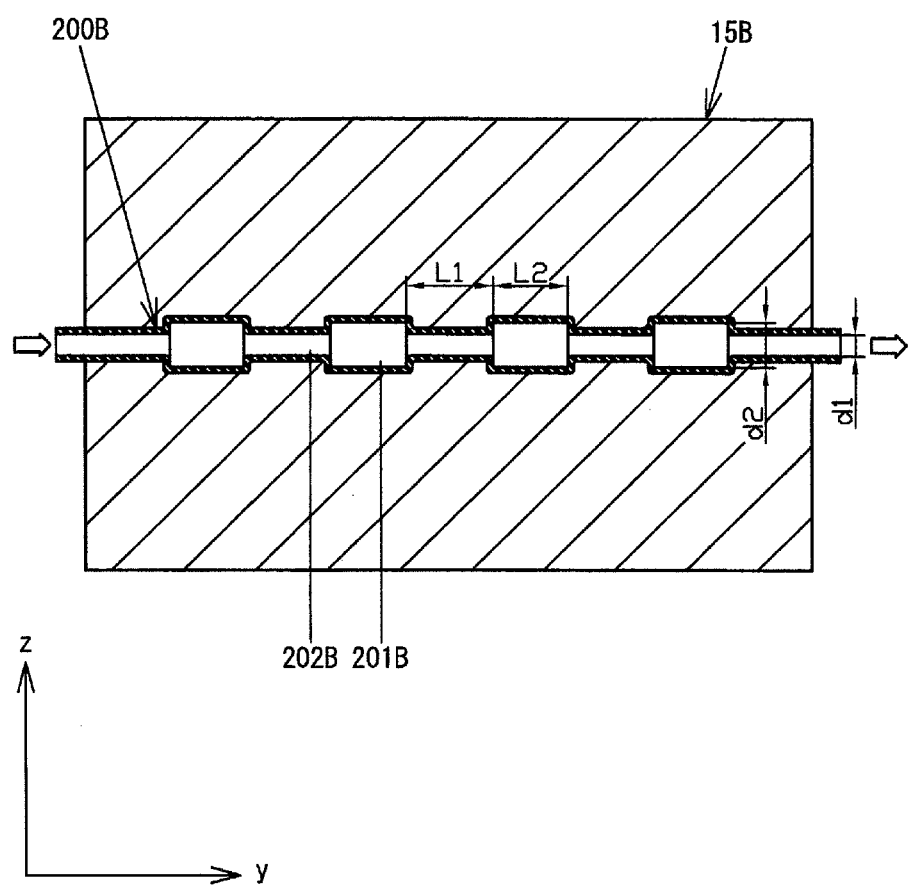
FIG. 18 is a cross-sectional view illustrating a cooling plate according to a second embodiment of the present invention.

A second embodiment of the present invention will be described with reference to FIG. 18. FIG. 18 is a cross-sectional view illustrating a cooling plate 15B according to the second embodiment of the present invention. In FIG. 18, the same or corresponding parts as those in the first embodiment are denoted by identical reference numbers attached with B, and differences therebetween will be mainly described. In a heat transfer pipe 200B according to the second embodiment, as in the first embodiment, large diameter pipes 201B and small diameter pipes 202B are alternately arranged. However, in the heat transfer pipe 200B according to the second embodiment, no widening pipes and no thinning pipes are interposed between the large diameter pipes 201B and the small diameter pipes 202B.

A length L1 of the small diameter pipes 202B and a length L2 of the large diameter pipes 201B are appropriately set from the viewpoints of the pressure loss and the heat transfer, or from the viewpoint of manufacturing. For example, when the pipe expansion such as the bulge processing is executed, if the length L2 of the large diameter pipes 201B cannot be sufficiently ensured, the length L2 of the large diameter pipes 201B is set to be shorter than the length L1 of the small diameter pipes 202B (L2<L1). When a reduction in the pressure loss within the heat transfer pipe 200B is executed, the length L2 of the large diameter pipes 201B is set to be equal to or larger than the length L1 of the small diameter pipes 202B (L2≥L1).

According to the second embodiment, when the refrigerant flows into the large diameter pipes 201B from the small diameter pipes 202B, the flow is detached from the pipe inner wall and into a jet flow, and collides with the flow within the large diameter pipes 201B small in the flow rate to form an eddy. Further, the flow of the refrigerant flowing into the small diameter pipes 202B from the large diameter pipes 201B is detached from the inlet end (corner) of the small diameter pipes 202B. Accordingly, the heat transfer is slightly deteriorated in the connection part of the small diameter pipes 202B and the large diameter pipes 201B. However, according to the second embodiment, the development of the thermal boundary layer is sufficiently prevented as compared with the related-art heat transfer pipe 200P of a simple circular pipe as illustrated in FIG. 17.

Analysis Example

An analysis example conducted by the aid of a CFD used widely will be described with reference to FIG. 19.

The analysis is the results of three-dimensional heat analysis implemented by an appropriate charging and discharging pattern on the battery modules according to the first and second embodiments, and a battery module having the cooling plate 15P (refer to FIG. 17) according to the related art in which the channel sectional area is not changed from the refrigerant inlet to the refrigerant outlet as a comparative example.

As the main analysis conditions, the inner diameters of the small diameter pipes 202A and 202B are d1=6 mm, the inner diameters of the large diameter pipes 201A and 201B are d2=8 mm, the refrigerant is ethylene glycol 50% solution, the flow rate of the refrigerant is 2 L/min, and the inlet temperature of the refrigerant is set to 25° C. The battery module is configured such that prismatic cells are arrayed in a layout of 3×4 on one surface of the cooling plate as illustrated in FIG. 3, and located 48 in total on both surfaces thereof. The cooling plate is made of die-cast aluminum, the heat generation per one cell is set to 5 W, the thickness of the cooling plate in the x-direction is set to 12 mm, the height of the cooling plate in the z-direction is set to 50 mm, and the length of the cooling plate in the y-direction is set to 360 mm.

Figure 19:
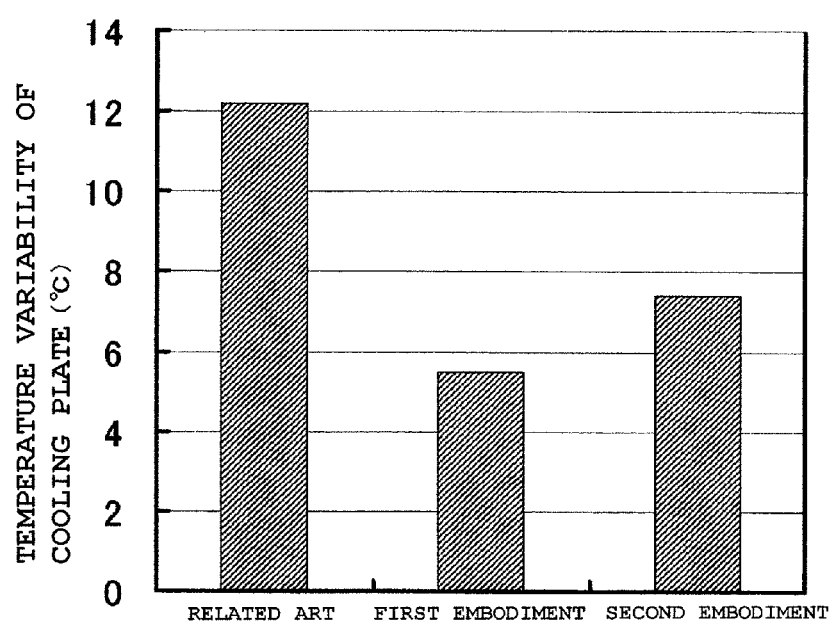
FIG. 19 is a diagram illustrating analysis results related to a variability in the temperature of the cooling plates according to the first and second embodiments of the present invention, and the related art.

FIG. 19 illustrates the analysis result where the axis of ordinate represents a temperature variability of the cooling plate. The temperature variability of the cooling plate represents a temperature difference between the vicinity of the refrigerant inlet and the vicinity of the refrigerant outlet of the cooling plate surface that thermally contacts with the cells.

As a result of the analysis, in both of the first and second embodiments, the effects of reducing the temperature variability of the cooling plate have been confirmed as compared with the related art. This is because according to the first and second embodiments, with the effect that the development of the thermal boundary layer is sufficiently prevented, the heat transfer within the pipe is improved, and the equalization of the temperature distribution on the cooling plate in the flow direction is facilitated. In particular, the reason that the temperature variability of the cooling plate according to the first embodiment is suppressed is because the detachment of the flow is prevented by the widening pipe and the thinning pipe, and the refrigerant is smoothly repetitively decelerated and accelerated.

As described above, as a result of the analysis, it is found that both of the first and second embodiments provide the battery module having the cooling structure that can facilitate the equalization of the temperatures of the plurality of cells that thermally contact with the cooling plate, and can reduce the variability of the state of charge-discharge and the battery lifetime of the respective cells 10.

Third Embodiment

Figure 20:
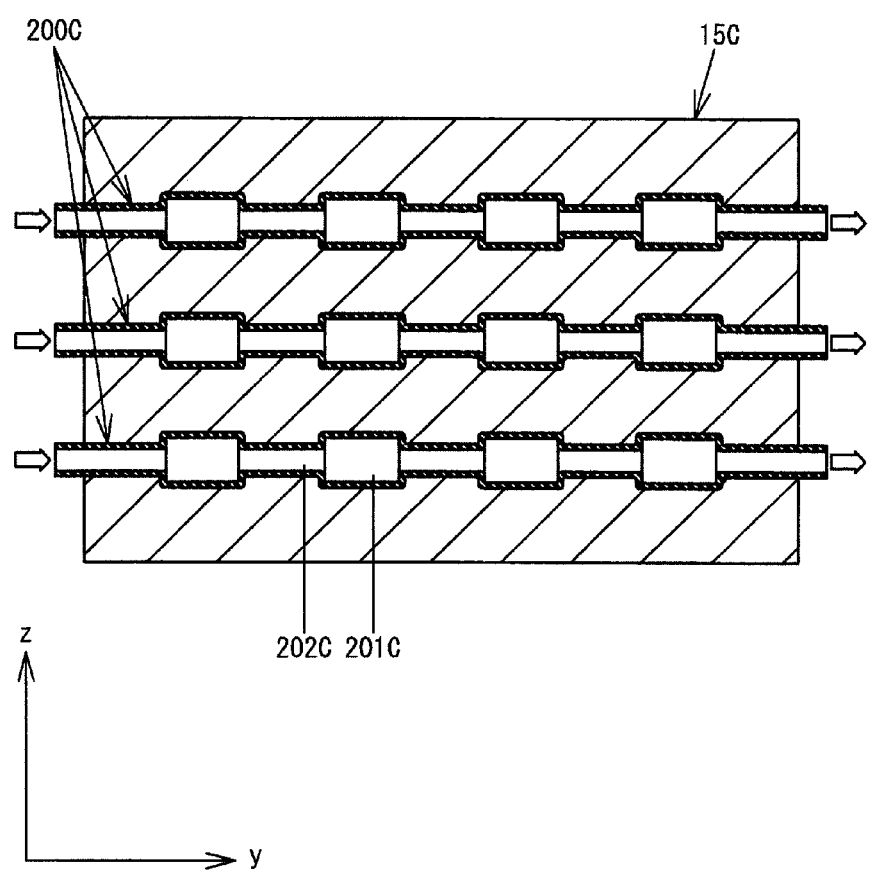
FIG. 20 is a cross-sectional view illustrating a cooling plate according to a third embodiment of the present invention.

A third embodiment of the present invention will be described with reference to FIG. 20. FIG. 20 is a cross-sectional view illustrating a cooling plate 15C according to the third embodiment of the present invention. In FIG. 20, the same or corresponding parts as those in the first embodiment are denoted by identical reference numbers attached with C, and differences therebetween will be mainly described.

In the third embodiment, three heat transfer pipes 200C each having large diameter pipes 201C and small diameter pipes 202C alternately arranged are arranged in the z (height) direction of the cooling plate 15C. The respective heat transfer pipes 200C are disposed in parallel to each other. With this configuration, the temperature variability of the cooling plate 15C in the z (height) direction can be also reduced. The number of heat transfer pipes 200C is appropriately set according to the layout of the cells 10.

Therefore, according to the third embodiment, in addition to the reduction in the temperature variability of the cooling plate 15C in the y (length) direction which is the flow direction of the refrigerant, the temperature variability of the cooling plate 15C in the z (height) direction is reduced so that the temperature distribution of the cooling plate 15C surface can be entirely equalized.

With the above configuration, even if the number of cells 10 in the array layout of the cells 10 is large, the number of heat transfer pipes 200C is increased according to the number of cells 10 so that the equalization of the temperatures of the respective cells 10 can be facilitated. This makes it possible to reduce the variability of the state of charge-discharge and the battery lifetime of the respective cells 10.

Fourth Embodiment

Figure 21:
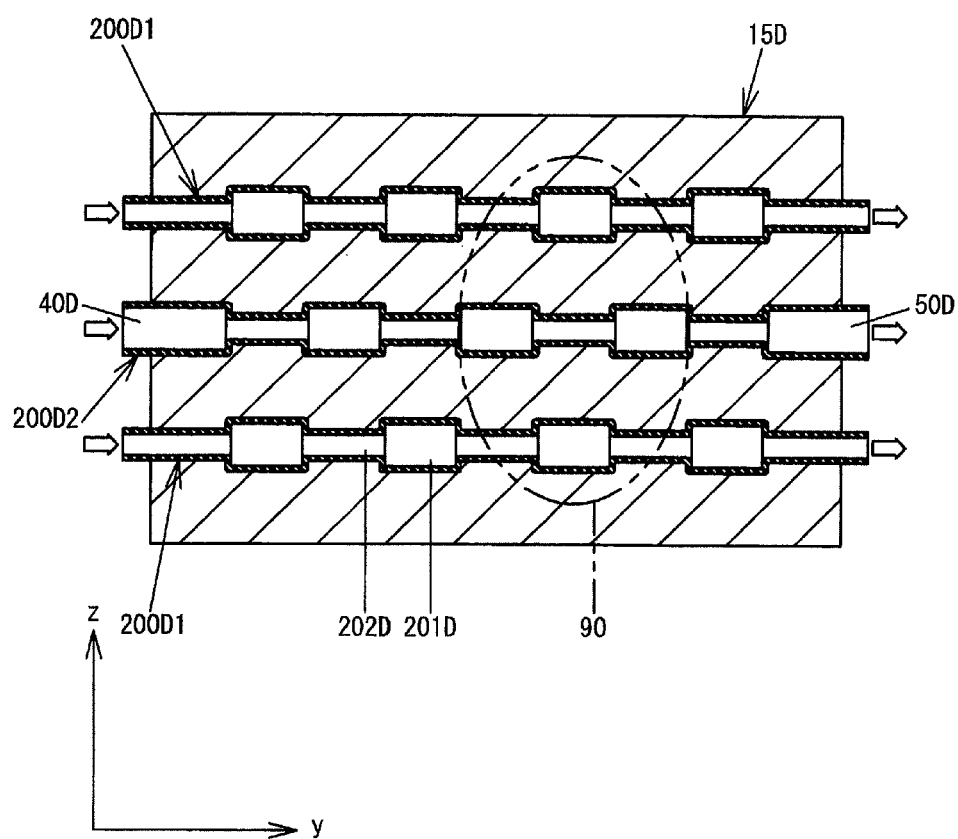
FIG. 21 is a cross-sectional view illustrating a cooling plate according to a fourth embodiment of the present invention.

A fourth embodiment of the present invention will be described with reference to FIG. 21. FIG. 21 is a cross-sectional view illustrating a cooling plate 15D according to the fourth embodiment of the present invention. In FIG. 21, the same or corresponding parts as those in the first embodiment are denoted by identical reference numbers attached with D, and differences therebetween will be mainly described.

In the fourth embodiment, three heat transfer pipes 200D1 and 200D2 are arranged in the z (height) direction of the cooling plate 15D as in the third embodiment. The respective heat transfer pipes 200D1 and 200D2 are displaced from each other by half pitches in the y (length) direction. In other words, as in an area indicated by reference numeral 90, a phase of the small diameter pipes 202D and the large diameter pipes 201D is displaced from each other in the z (height) direction.

The fourth embodiment employs a structure in which a plurality of heat transfer pipes are provided, and places where the flow rate of the refrigerant is accelerated to improve the heat transfer within the pipes are displaced. With this structure, in addition to the effect of reducing the temperature variability of the cooling plate 15D in the y (length) direction which is the flow direction of the refrigerant, the temperature variability of the cooling plate 15D in the z (height) direction is more reduced so that the temperature distribution of the cooling plate 15D can be entirely equalized.

As illustrated in FIG. 21, the center heat transfer pipe 200D2 is extended so that the large diameter pipes 201D are protruded outward from the cooling plate 15D. A portion that is protruded outward from one end functions as a refrigerant inlet 40D, and a portion that is protruded outward from the other end functions as a refrigerant outlet 50D.

Fifth Embodiment

Figure 22:
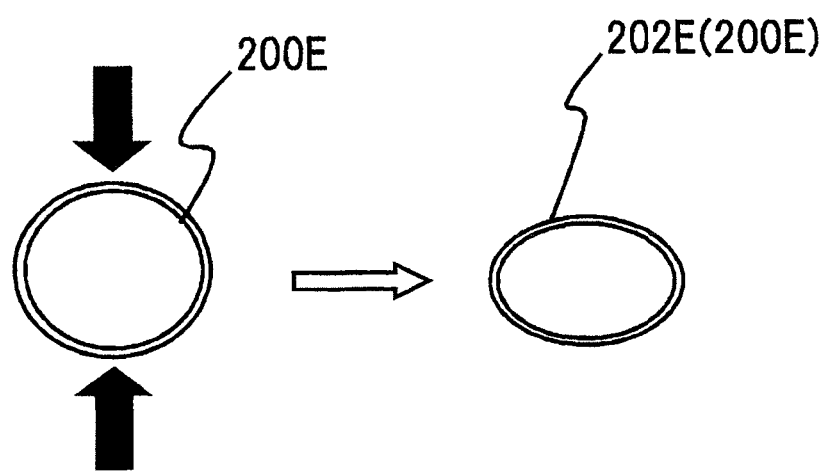
FIG. 22 is a cross-sectional view illustrating an acceleration part of a heat transfer pipe according to a fifth embodiment of the present invention.

A fifth embodiment of the present invention will be described with reference to FIG. 22. FIG. 22 is a cross-sectional view illustrating each acceleration part 202E of a heat transfer pipe 200E according to the fifth embodiment of the present invention. In FIG. 22, the same or corresponding parts as those in the first embodiment are denoted by identical reference numbers attached with E, and differences therebetween will be mainly described. In the fifth embodiment, each small diameter pipe is replaced with the acceleration part 202E having an oval cross-section. The acceleration part 202E is flattened by mechanically crushing one heat transfer pipe 200E having a single diameter at appropriate distances toward the inside in the radial direction from the external by a given external force so as to nip the heat transfer pipe 200E vertically. Portions not crushed function as deceleration parts (not shown) each having a channel sectional area larger than the channel sectional area of the acceleration part 202E.

The acceleration parts 202E and the deceleration parts are alternately formed in the refrigerant flow direction to obtain the same effects as those in the first embodiment. Further, according to the fifth embodiment, no troublesome fabrication is required, and the costs can be reduced, as compared with a case in which the small diameter pipes are swaging-fabricated.

Sixth Embodiment

Figure 23:
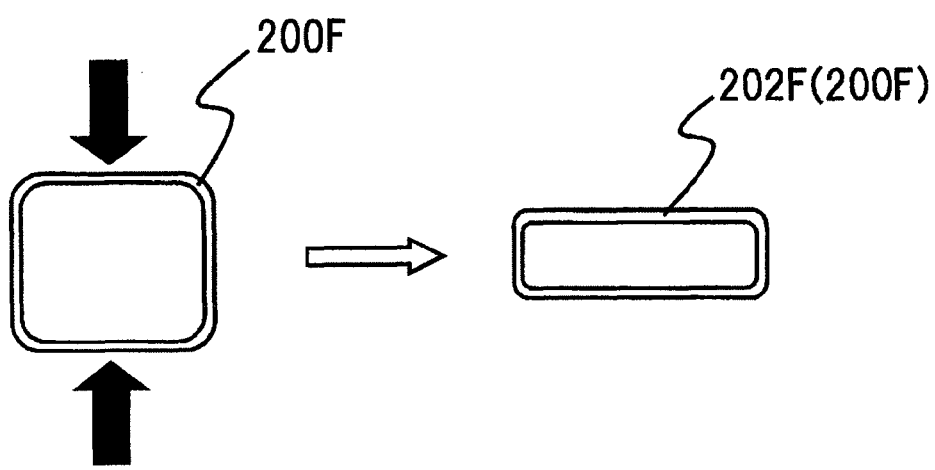
FIG. 23 is a cross-sectional view illustrating an acceleration part of a heat transfer pipe according to a sixth embodiment of the present invention.

A sixth embodiment of the present invention will be described with reference to FIG. 23. FIG. 23 is a cross-sectional view illustrating each acceleration part 202F of a heat transfer pipe 200F according to the sixth embodiment of the present invention. In FIG. 23, the same or corresponding parts as those in the first embodiment are denoted by identical reference numbers attached with F, and differences therebetween will be mainly described.

In the sixth embodiment, the cross-section of the heat transfer pipe 200F is a square with rounded four corners. In the sixth embodiment, one heat transfer pipe having a single sectional area is nipped at appropriate distances from the external so as to crushed to form the acceleration parts 202F. Portions not crushed function as deceleration parts (not shown).

In this way, even if the channel cross-section is substantially square, the same effects as those in the above-mentioned first embodiment are obtained.

The following modifications also fall within the scope of the present invention, and one or a plurality of modifications can be combined with the above-mentioned embodiments.

Figure 24:
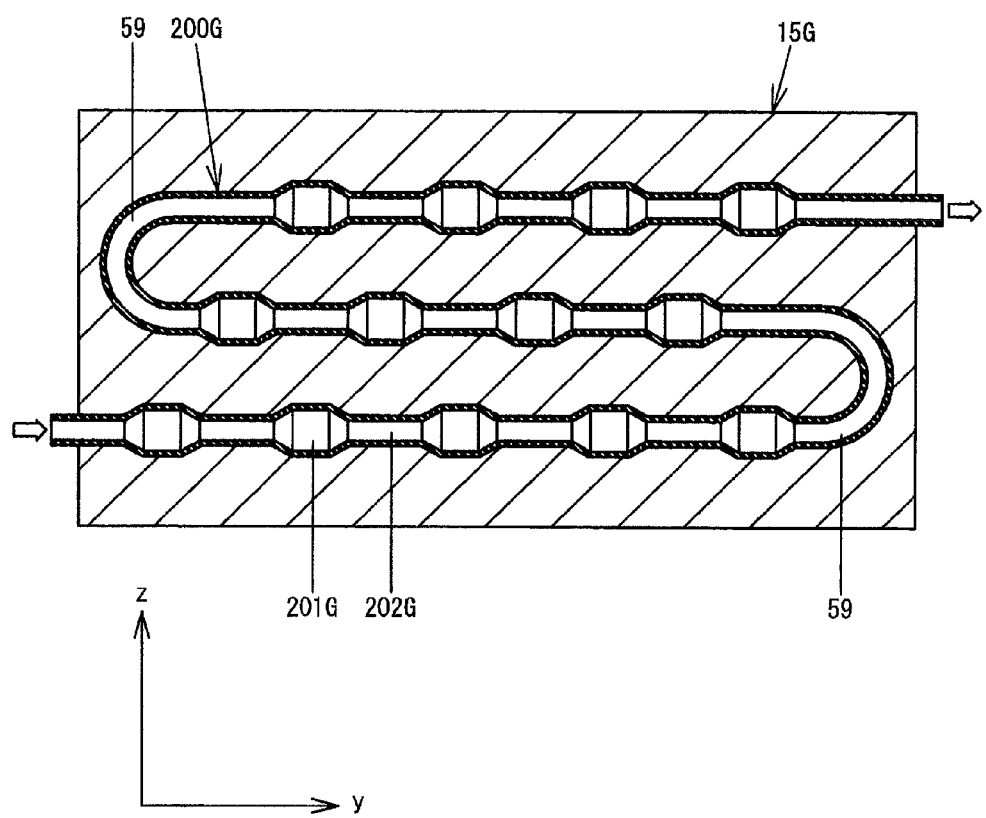
FIG. 24 is a cross-sectional view illustrating a cooling plate according to a first modified example of the present invention.

(1) In the above-mentioned embodiments, the heat transfer pipes are linearly arranged. However, the present invention is not limited to this configuration. As illustrated in FIG. 24, a heat transfer pipe 200G equipped with return parts 59 so as to make a U-turn of the refrigerant once or a plurality of times may be incorporated into a cooling plate 15G. Even with this configuration, because large diameter pipes 201G and small diameter pipes 202G are alternately disposed along the flow of the refrigerant, the development of the thermal boundary layer can be suppressed.

Figure 25:
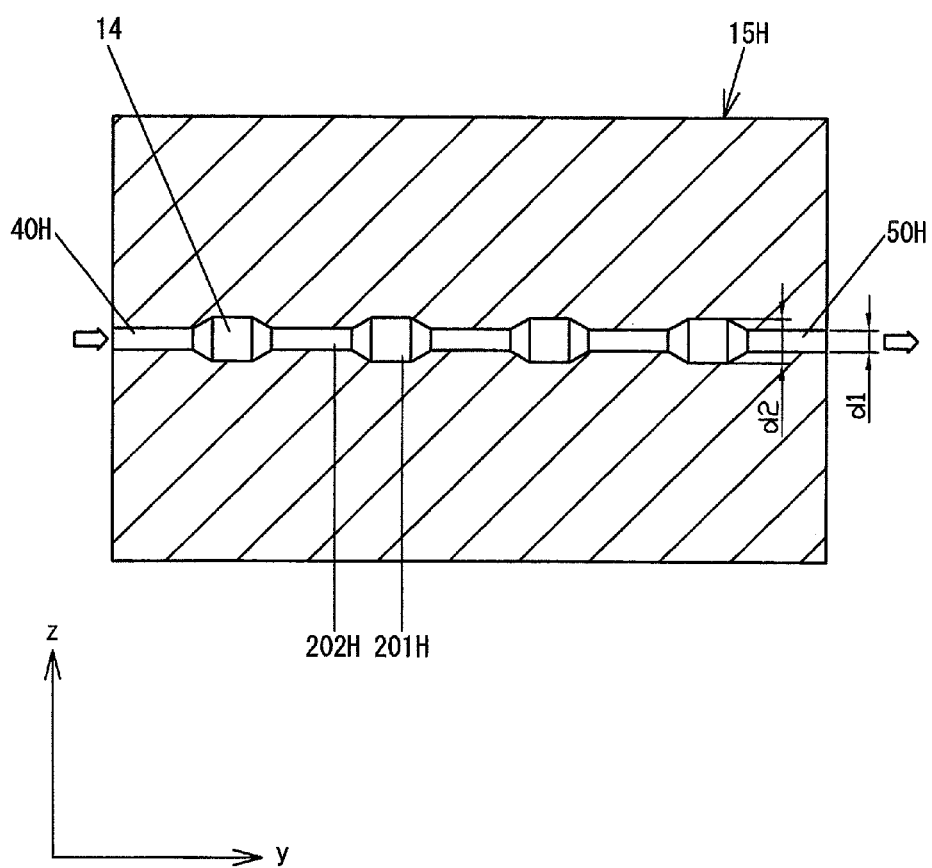
FIG. 25 is a cross-sectional view illustrating a cooling plate according to a second modified example of the present invention.

(2) In the above-mentioned embodiments, the heat transfer pipes are incorporated into the cooling plate. However, the present invention is not limited to this configuration. As illustrated in FIG. 25, without provision of the heat transfer pipe, deceleration parts 201H larger in the channel sectional area and acceleration parts 202H smaller in the channel sectional area may be disposed within the cooling plate 15H by casting or the like. A refrigerant inlet 40H and a refrigerant outlet 50H are formed within the cooling plate 15H without being protruded outward from the cooling plate 15H. In this case, the connection parts of the coupling pipe are fitted into the refrigerant inlet 40H and the refrigerant outlet 50H.

Figure 26:
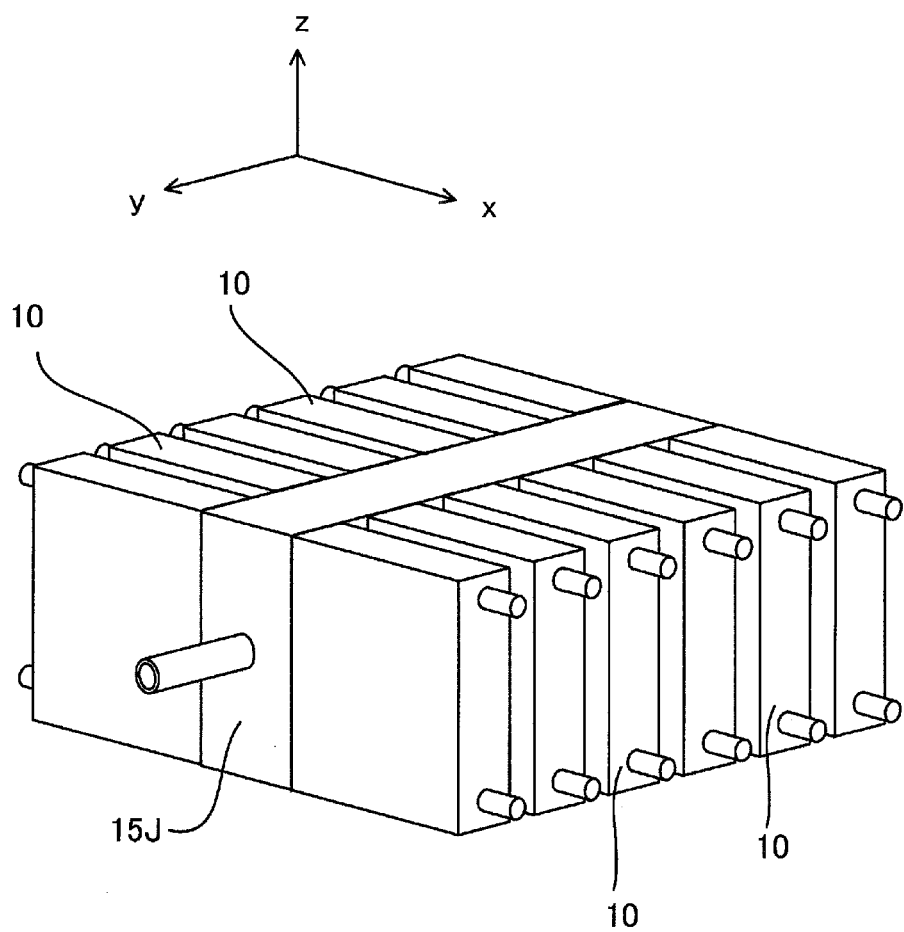
FIG. 26 is a diagram illustrating a cooling structure of a battery module according to a third modified example of the present invention.

(3) The array layout of the cells 10 relative to the cooling plate is not limited to the above-mentioned embodiments (refer to FIG. 3). For example, as illustrated in FIG. 26, the plurality of cells 10 may be aligned on a line along the y (length) direction of the cooling plate 15J. In FIG. 26, the respective cells 10 are arranged in direction different by 90° from that in the above-mentioned embodiments (refer to FIG. 3). That is, in the above-mentioned embodiments, 3×4 prismatic cells are arranged on the cooling plate. However, the present invention is not limited to the above structure, but the prismatic cells or the cylindrical cells can be arranged through the cooling plate in various layouts.

Figure 27:
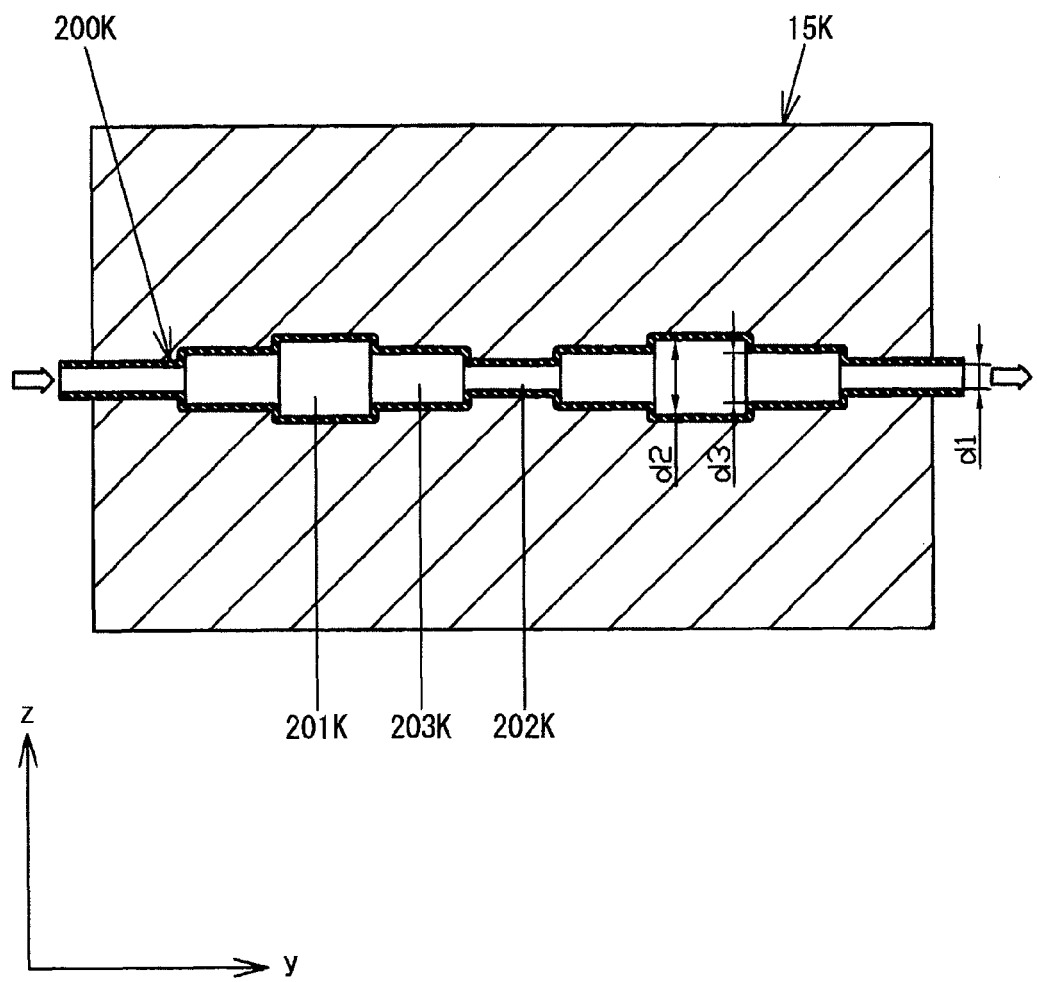
FIG. 27 is a cross-sectional view illustrating a cooling plate according to a fourth modified example of the present invention.

(4) In the above-mentioned embodiments, the large diameter pipes and the small diameter pipes are alternately disposed. However, the present invention is not limited to this configuration. As illustrated in FIG. 27, middle diameter pipes 203K each having an inner diameter d3 larger than the inner diameter d1 of small diameter pipes 202K and smaller than the inner diameter d2 of the large diameter pipes 201K may be further provided in a cooling plate 15K. With this configuration, the small diameter pipes 202K, the middle diameter pipes 203K, and the large diameter pipes 201K may be appropriately combined together to repetitively conduct the acceleration and the deceleration. When the refrigerant flows into the middle diameter pipe 203K from the small diameter pipes 202K, because the refrigerant is decelerated in the middle diameter pipes 203K, the middle diameter pipes 203K function as the deceleration parts. When the refrigerant flows into the middle diameter pipe 203K from the large diameter pipes 201K, because the refrigerant is accelerated in the middle diameter pipes 203K, the middle diameter pipes 203K function as the acceleration parts. Further, not only three types of pipes but also four or more types of pipes can be combined together to accelerate or decelerate the refrigerant.

(5) In the above-mentioned embodiments, the refrigerant inlet and the refrigerant outlet of the cooling plate are identical in the cross-sectional shape with the deceleration parts or the acceleration parts. However, the present invention is not limited to this configuration. The refrigerant inlet and the refrigerant outlet can be formed into a cross-sectional shape different from that of the deceleration parts and the acceleration parts.

(6) The present invention is not limited to the case in which the cross-sectional shape of the heat transfer pipe is circular or square. The cross-section of the heat transfer pipe can be formed into a variety of shapes such as polygon of triangle or pentagon or more, and a curved cross-section other than circle or oval.

(7) In the above-mentioned embodiments, the lithium-ion battery is used as the cell. However, the present invention is not limited to this configuration. Other secondary batteries such as Ni-MH (nickel metal hydride rechargeable battery), or Ni—Cd (nickel-cadmium rechargeable battery) can be used as the cells.

(8) The refrigerant is not limited to ethylene glycol solution. Various refrigerants such as water or ethanol can be applied. The materials and shapes of the cooling plate and the heat transfer pipe are designed according to the properties of the refrigerant.

(9) The above-mentioned embodiments employ the structure in which the clips 30 are used as elastic members that attract the terminal covers 25 to the end plates 21 side. However, the present invention is limited to this configuration. Elastic members other than the clips 30 may be used. For example, a tension spring may be extended between the terminal covers 25 and the end plates 21. Alternatively, the covers 28 may be fixed to the end plates 21, and a compression spring, a leaf spring, or a disc spring that urges the terminal covers 25 may be fitted to the covers 28.

Not the structure using the elastic member, but a structure in which the terminal covers 25 are pushed against the end plates 21 side by a fastening member may be applied.

The present invention is not limited to the above embodiments without departing from the features of the present invention, and other configurations conceivable within the technical concept of the present invention also fall within the scope of the present invention.

What is claimed is:

1. A battery module comprising:
   a cooling plate having a refrigerant channel in which refrigerant circulates; and
   a plurality of cells that are thermally conductively coupled onto a surface of the cooling plate,
   wherein the refrigerant channel is formed with a plurality of deceleration parts that decelerate the refrigerant and a plurality of acceleration parts that accelerate the refrigerant,
   wherein a channel sectional area of the deceleration parts is larger than a channel sectional area of the acceleration parts, and the deceleration parts and the acceleration parts are alternately disposed along a flow direction of the refrigerant, and
   wherein a sectional area reduction part that gradually decreases the channel sectional area toward the flow direction of the refrigerant from the deceleration parts is disposed between the deceleration parts and the acceleration parts, and a sectional area enlargement part that gradually increases the channel sectional area toward the flow direction of the refrigerant from the acceleration parts is disposed between the acceleration parts and the deceleration parts.

2. The battery module according to claim 1, wherein the refrigerant channel is formed of a heat transfer pipe incorporated into the cooling plate.

3. The battery module according to claim 1, wherein a plurality of refrigerant channels are provided, and the plurality of refrigerant channels are disposed in parallel to each other.

4. The battery module according to claim 1, wherein a cross-sectional shape of the refrigerant channel is circular.

5. The battery module according to claim 1, wherein a cross-sectional shape of the refrigerant channel is polygonal.

6. The battery module according to claim 1, wherein the acceleration parts are formed by mechanically crushing the heat transfer pipe.

7. The battery module according to claim 1, wherein the plurality of cells are arranged along the flow direction of the refrigerant.

8. An power supply apparatus comprising:
   a cooling system having a plurality of battery modules according to claim 1 for cooling refrigerant,
   wherein the refrigerant cooled by the cooling system is branched and supplied to refrigerant channels of the cooling plates of the respective battery modules, and the refrigerant discharged from the refrigerant channels of the cooling plates of the respective battery modules is merged together, and recovered into the cooling system.

* * * * *